(12) United States Patent
Beavers

(10) Patent No.: US 9,591,829 B2
(45) Date of Patent: Mar. 14, 2017

(54) CATTLE HOOF TRIMMING CHUTE

(71) Applicant: Brandon Beavers, Lebanon, KY (US)

(72) Inventor: Brandon Beavers, Lebanon, KY (US)

( * ) Notice: Subject to any disclaimer, the term of this patent is extended or adjusted under 35 U.S.C. 154(b) by 185 days.

(21) Appl. No.: 14/561,348

(22) Filed: Dec. 5, 2014

(65) Prior Publication Data

US 2015/0264889 A1    Sep. 24, 2015

Related U.S. Application Data

(60) Provisional application No. 61/968,803, filed on Mar. 21, 2014, provisional application No. 61/696,514, filed on Mar. 24, 2014.

(51) Int. Cl.
*A01K 1/00* (2006.01)
*A01K 1/06* (2006.01)
*A61D 3/00* (2006.01)
*A01L 13/00* (2006.01)

(52) U.S. Cl.
CPC ............ *A01K 1/0613* (2013.01); *A01L 13/00* (2013.01); *A61D 3/00* (2013.01); *A61D 2003/003* (2013.01); *A61D 2003/006* (2013.01)

(58) Field of Classification Search
CPC .................................................. A01K 1/0613
USPC ................................. 119/723, 721, 815, 816
See application file for complete search history.

(56) References Cited

U.S. PATENT DOCUMENTS

| | | | | |
|---|---|---|---|---|
| 2,000,122 A | * | 5/1935 | Duncan | A61D 3/00 119/723 |
| 2,446,769 A | * | 8/1948 | Keirsey | A01K 1/0613 119/723 |
| 2,672,126 A | | 3/1952 | Linton | |
| 2,737,153 A | * | 3/1956 | Dupont | A01K 1/0613 119/723 |
| 2,991,755 A | | 3/1961 | Ekren et al. | |
| 3,276,433 A | * | 10/1966 | Tougas | A01K 1/0613 119/722 |
| 3,590,784 A | * | 7/1971 | Fly | A61D 3/00 119/722 |
| 3,960,113 A | * | 6/1976 | Kratky | A01K 1/0613 119/723 |

(Continued)

FOREIGN PATENT DOCUMENTS

| | | |
|---|---|---|
| CA | 1063446 | 10/1979 |
| CA | 2635271 A1 | 12/2008 |

(Continued)

*Primary Examiner* — Monica Williams
*Assistant Examiner* — Aaron Rodziwicz
(74) *Attorney, Agent, or Firm* — Michael Coblenz

(57) ABSTRACT

An animal restraining chute having a four sided cage with a closeable front and rear opening and two sides constructed from a series of ribs made from a single bent component to provide structural support. A partially closable front gate closes the front opening and restrains the head of the animal, and a curved rear pusher gate secures the hindquarters of an animal. A rotatable belly restraint pins the animal to one of the sides. The chute is rotatably mounted on a vehicle or platform to lay the animal on its side. The chute includes four hydraulic activated leg latches for securing the legs of the animal. There is a movably attached staging area located at the rear of the chute to allow for the positioning of animals waiting to enter the chute. Each of the movable components of the chute are hydraulically and remotely controlled.

31 Claims, 16 Drawing Sheets

(56) References Cited

U.S. PATENT DOCUMENTS

| | | | | |
|---|---|---|---|---|
| 4,055,148 | A | * | 10/1977 | Brockman .......... A01K 1/0613 119/723 |
| 4,162,685 | A | * | 7/1979 | Knappenberger ....... A61D 3/00 119/723 |
| 4,195,595 | A | * | 4/1980 | Shimonovich .......... A61D 3/00 119/724 |
| 4,228,766 | A | * | 10/1980 | Wedman ................. A61D 3/00 119/723 |
| 5,109,802 | A | | 5/1992 | Priefert |
| 5,282,441 | A | * | 2/1994 | Ricketts ............... A01K 1/0613 119/724 |
| 5,441,016 | A | * | 8/1995 | Ricketts ............... A01K 1/0613 119/723 |
| 5,669,332 | A | * | 9/1997 | Riley ..................... A61D 3/00 119/724 |
| 7,195,076 | B2 | | 3/2007 | De Vor |
| 8,561,576 | B2 | | 10/2013 | Pingsterhaus |
| 2003/0140870 | A1 | * | 7/2003 | Daniels ............... A01K 1/0613 119/752 |
| 2009/0078217 | A1 | * | 3/2009 | Riley ................... A01K 1/0017 119/723 |
| 2010/0319630 | A1 | | 12/2010 | Treadway et al. |
| 2011/0036305 | A1 | | 2/2011 | Gipson |
| 2011/0146591 | A1 | * | 6/2011 | Pingsterhaus ........ A01K 1/0613 119/732 |
| 2012/0192808 | A1 | * | 8/2012 | Daniels ............... A01K 1/0613 119/729 |
| 2013/0192538 | A1 | | 8/2013 | Ulrich |

FOREIGN PATENT DOCUMENTS

| | | |
|---|---|---|
| CA | 2744727 A1 | 1/2012 |
| EP | 1665926 A2 | 6/2006 |
| IL | WO9957968 A1 | 11/1999 |
| NL | EP2656730 A1 | 10/2013 |
| WO | WO9952351 A1 | 10/1999 |
| WO | WO2013152768 A1 | 10/2013 |

* cited by examiner

CATTLE HOOF TRIMMING CHUTE

CROSS REFERENCE TO RELATED APPLICATIONS

This application claims priority to U.S. Provisional Patent Application No. 61/968,803 filed on Mar. 21, 2014, and U.S. Provisional Patent Application No. 61/969,514 filed Mar. 24, 2014. The teachings of both provisional applications are fully incorporated herein.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND OF THE INVENTION

Field of the Invention

The present invention relates to a restraining chute for holding animals for the purpose of veterinary and other inspection, and for trimming the hooves of animals such as cattle. The present invention is a fully automated chute that restrains the animal, lays it on its side, and secures its legs for inspection and trimming of the hooves.

Description of the Related Art

The hooves of ungulated animals grow continually. In some situations the animal walks enough so that the hooves are naturally worn down. But domesticated livestock typically do not walk or roam sufficiently, and in many cases their hooves need to be trimmed on occasion for the health and well being of the animal. The hooves of cattle are typically trimmed while the animal is immobilizing in a chute. In some cases the chute is raised and the hooves are trimmed when hanging below the animal. In other cases the animal is placed in a "layover" chute that flips the animal onto it side, with the hooves extending from the bottom or the chute. It is often easiest to trim the hooves when the legs are restrained or stabilized. Hoof trimming chutes are well known. Some examples can be seen in U.S. Pat. No. 4,228,766 to Wedman, U.S. Pat. No. 5,669,332 to Riley, and U.S. Pat. No. 8,561,576 to Pingsterhaus. All three disclose variations of a chute for holding and immobilizing cattle and laying over the animal on to its side in order trim the hooves.

Modern layover hoof trimming chutes make trimming cattle hooves relatively easy, and while all of the prior art chutes have advantages, they also have disadvantages. U.S. Pat. No. 5,669,332 to Riley (the Riley patent) for example, uses a series of hydraulic controls to open and close the front and rear gates of the chute and tilt the chute into and from the layover position. But the Riley patent places the hydraulic controls at the rear of the chute, which means the person operating the controls cannot see the head of the animal is it nears and extends from the front gate. This typically means that trimming cattle hooves becomes a two person operation, with one person controlling the animal as it is herded into the chute, and the other person operating the hydraulic controls. There is a need, therefore, for a means for controlling the moving features of the chute where the operator can see the animal in the chute while operating the controls.

When cattle are in the horizontal position in a layover chute their legs are extended from the bottom of the chute. Some cattle flail while others seemed stunned and lay stock still. It is necessary to immobilize the hooves for trimming or other procedures. This is commonly done with a rope or chain that is attached to the chute and that is wrapped around the leg near the ankle and tied down or secured in other ways. It often requires both hands to tie down a cattle leg. One hand holds the leg and the other loops the rope around the leg. The problem occurs when the leg is released in order to tie the rope or secure the chain. In some cases the animal will kick or jerk the leg away. There is a need, therefore, for a device to secure the leg that can be operated and secured easily. The other problem encountered with restraining the leg with a rope or chain is that the rope or chain must be secured relatively tightly around the animal's lower leg. In some cases this can cause injury to the animal, particularly if the animal is skittish and attempts to pull away. There is a need, therefore, for a restrain that secures the leg without wrapping tightly around the leg and that does not directly contacts the skin of the animal.

The cage of the standard layover chute is constructed by bolting or welding together the front gate, the two side walls, and the rear gate. This is often done with cross beams and other connecting structure. A typical example can be seen in U.S. Pat. No. 5,669,332. The cage of a hoof trimming chute is subjected to extreme and dynamic forces. The cage must restrain a very large animal. While cattle are often docile, when frightened or agitated they often thrash about, and simply due to their size can cause considerable force on the cage. Additionally, in a layover chute the cage is rotated from the vertical to the horizontal position every time a animal's hooves are trimmed. This places additional forces on the chute. Because of these forces it is not uncommon for the attachment to loosen, weaken or break. There is a need, therefore, for a cage structure with integrated and strengthened components to ensure the stability and long life of the chute.

Animals are brought to the rear of the chute by means of gating or fencing that is positioned to create narrow walkways that are just wide enough for one animal to walk through, which forces the animals to approach the chute in single file. (Note, these narrow walkways are commonly referred to as "chutes" but because that word is also used to describe the device herein, these walkways will be referred to as narrow walkways.) One of the problems encountered in bringing the animals to the rear of the chute is that they will push up against the back of the chute or get in the way of the trimmer or the operator or the moving components of the chute. There is a need, therefore, for a way to keep the animals away from the back side of the chute, and that is integrated within the chute.

Standard chutes typically have a rear or tail gate to prevent the animal from backing out of the chute. In some cases the tail gate is little more than a single bar across the rear of the chute. In all cases the tail gate is flat, which means that if the animal does attempt to back up, and if the tail gate is not fully closed, the animal's hindquarters can slide to side and out of the gate. There is a need, therefore, for a concave tail gate that cups the animal's hindquarters and prevents the animal from squeezing out of the rear of the chute.

The fencing or gating that is used for assembling the narrow walkways is frequently brought to the location by the hoof trimmer. The gating, which is typically about eight to ten feet long and five to six feet high, is often carried by the trimmer on the truck or other vehicle with the trimming chute. Sometimes the fencing is stored within the chute, other times it is strapped to the chute during transit. The vehicles generally operate on road and highways, as the chute is moved from one location to another. There is a need, therefore, for a way to securely stow the fencing, and conveniently attach it so that it is readily available to use, but also out of the way of the wheels of the vehicle during transit.

During the hoof trimming and inspection process the hoof trimmer or operator requires different equipment, such as the grinder that is used to trim the hooves. Medication is often used if sore or lesions are found on the lower legs or on the hooves. This medicine and equipment is often stored in storage boxes located on the vehicle to provide easy access during the hoof trimming process. In some cases a hoof will be cracked, or will be damaged during the trimming operation. In these situations a hoof glue is used that can temporarily secure the hoof. In some cases a small cap or cover can be placed on the bottom of the hoof to serve as a temporary pad while the hoof heals, and these are glued to the hoof. There are many types of hoof glues, which are well known in the industry. One hoof glue is heated and liquefied and applied hot, and it solidifies and binds as it cools. This hoof glue is typically warmed by wrapping with a heating pad. It would be desirable for a heated storage box to be located in an easily accessible location when the chute is in the layover position so that the trimmer will have easy access to heated glues.

SUMMARY OF THE INVENTION

This invention relates to a chute for holding and immobilizing cattle so that their hooves can be trimmed. The invention consists of a metal cage with a front gate, a rear gate and two side walls for holding an animal. The cage is slightly larger than the animals to be restrained, which are typically cattle. The animal is herded into the cage through the rear gate and the rear gate is closed. The rear gate is curved to scoop the haunch of the animal and push it into the chute. The animal's head is extended out through a portion of the front gate, and the front gate closes loosely around the animal's neck to hold the animal in place. When the gate is in the closed position it is slightly wider than the animal's neck so that it does not choke the animal, but narrower than the head or shoulders so that the animal is retrained. There is a belly restraining bar rotatably mounted on the outside wall that presses against the cows belly to hold the cow firmly against the inside wall and securely within the chute. The chute is then lifted and rotated 90 degrees so that the cow's legs and hooves are extending outwardly from the bottom of the chute.

The two side walls of the invention are constructed from a series of parallel tubes bent into an inverted u-shape to create a strengthened structural ribbed framework for the inside and outside walls. The inside wall includes a piece of metal attached to the ribs to create a flat surface for the animal to lie upon when the chute is in the layover position. There is a gap in the surface of the inside wall that corresponds to the front shoulder of the animal, and there is a shoulder pad placed in the gap to protect the shoulder of the animal when the chute is in the layover position. There is also a gap in the surface of the inside wall that corresponds to the anus of the animal, which allows urine or feces to flow out of the cage.

There are four cattle leg latches located on the bottom of the chute, one for each cow leg. The legs are secured by means of the leg latches, and the cow is now in position so that its hooves can be easily trimmed by a single hoof trimmer. The leg latches are hydraulically controlled, and manipulated by a hand held remote control device so that the trimmer can hold a leg in one hand and easily operate the remote control to close the latch with the other hand.

There is a staging at the rear of the chute. The staging area consists of a three-sided pen that prevents waiting animals from getting in the way of the operator and the moving components of the chute, particularly the tail gate, which swings down behind the rear of the chute. The staging area allows the hoof trimmer or operator to manage the movement of the animals into the chute, which allows the trimmer to control the flow of cows through the hoof trimming process. There is also an accessory frame mounted on the vehicle for holding various accessories needed for trimming cattle hooves. There is a movable gate rack that is used to hold gate fencing that is used to create the narrow walkways to channel the animals to the rear of the chute. The gate rack is hydraulically controlled and can be lowered to easily access and remove the gating and then raised to move the gating out of the way of the tires of the vehicle when in transit. There is also a series of boxes mounted on the vehicle for holding trimming tools and accessories. One of the boxes includes an incorporated heating element to create a "hot box" that is used for heating melting glues that are used for repairing damaged hooves.

Each of the moving components of the layover chute is controlled by a hydraulic piston, and each piston is controlled remotely by a hand held remote control. This allows the operator to control the components of the chute, but also position himself to view the animal and the chute so that he can observe the animal and know when to operate the various functions of the chute. In one variation of the invention the remote control can be operated by a smart phone through a downloadable smart phone program, known as an "app" or smart phone application.

DETAILED DESCRIPTION OF THE INVENTION

Detailed embodiments of the present invention are disclosed herein. It is to be understood that the disclosed embodiments are merely exemplary of the invention, and that there may be a variety of other alternate embodiments. The figures are not necessarily to scale, and some features may be exaggerated or minimized to show details of particular components. Therefore, specified structural and functional details disclosed herein are not to be interpreted as limiting, but merely as a basis for teaching one skilled in the art to employ the varying embodiments of the present invention.

The present invention is a layover chute for restraining an animal for the purposes of trimming its hooves. The teachings of this invention can be applied for restraining chutes used for other types of animals, and for other purposes, such as medical inspection or treatment, but in the preferred embodiment the invention is a chute for trimming the hooves of cattle. The chute of the present invention can be mounted on a stationary platform, the flatbed of a large pick-up truck, or on a hitched trailer which is towed behind a truck or other vehicle. Mounting on a vehicle allows the chute to be transportable and taken to farms for trimming of cattle hooves. All of the main operative features, and unique features of the invention, are present in any configuration. The drawings of this application show the chute mounted on a trailer, but the inventive features will work regardless of the type of vehicle, or where the chute is mounted.

Figure 1:
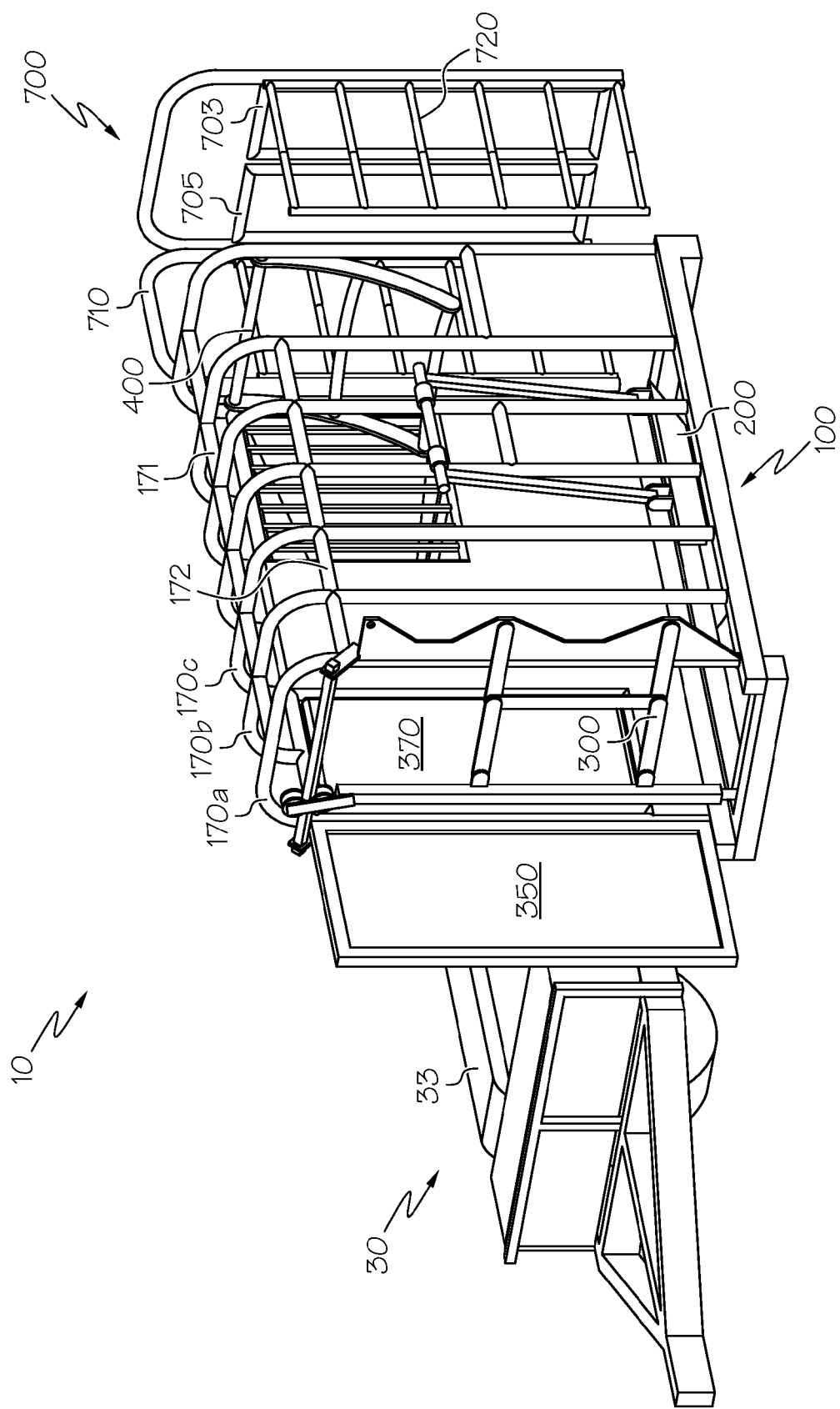
FIG. 1 is a front perspective view of the layover cattle restraining chute in the upright or standing position.
Figure 2:
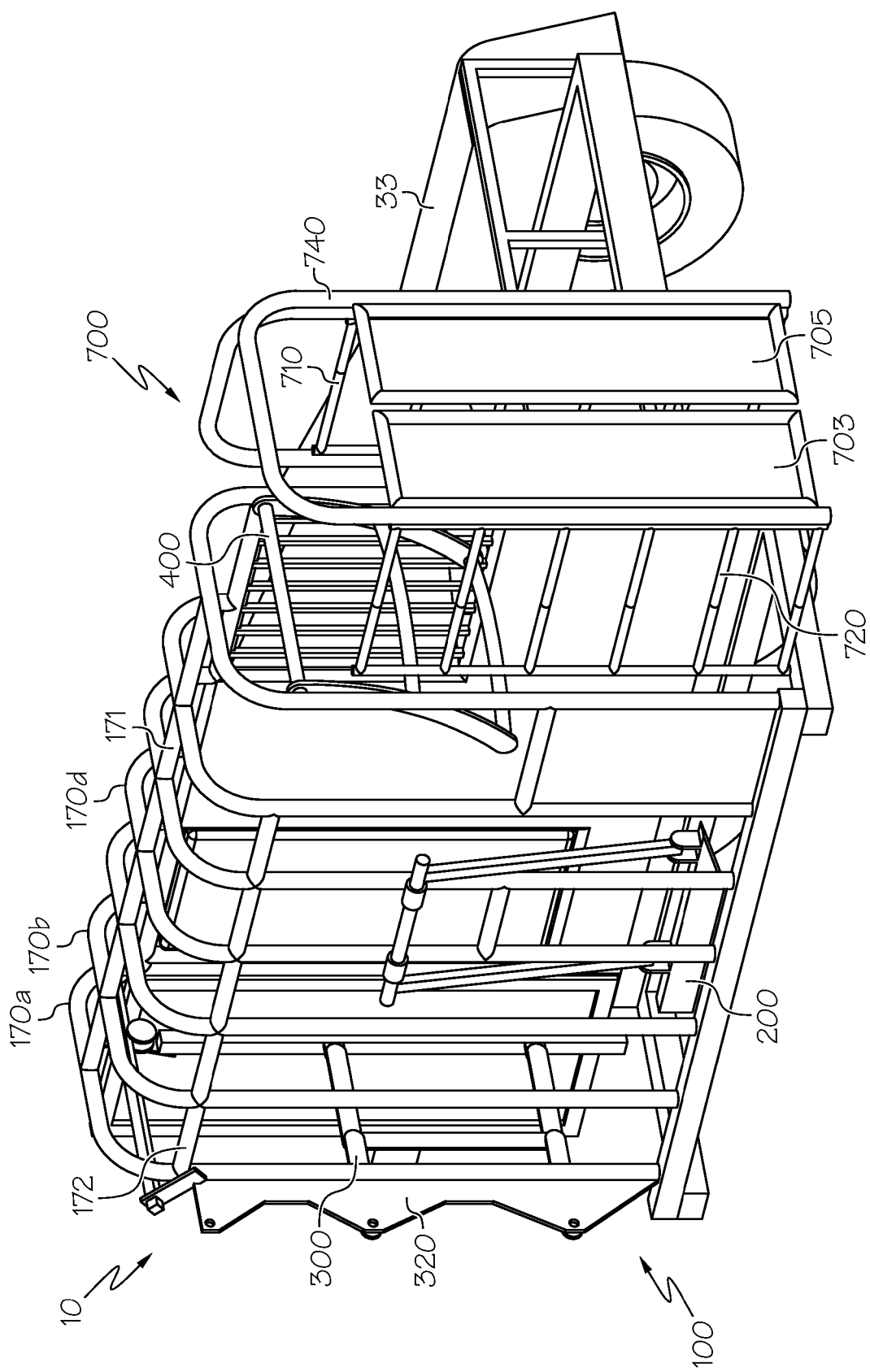
FIG. 2 is a rear perspective view of the layover chute in the standing position.

An overview of the main components of the invention will be set out first, and then each of the various components will be described in detail. FIG. 1 & FIG. 2 are front and rear perspective views of the chute 10 respectively, and show the main components of the chute 10, but without the hydraulic system that controls the moving parts of the chute 10. Those hydraulic and controlling components will be discussed in detail below. The main components of the layover chute 10 consist of the cage 100 of the layover chute 10, the vehicle 30 upon which the cage 100 is pivotally mounted, and the staging area 700 located just behind the rear of the cage 100. The cage 100 is four sided, having: an inside wall 110, which is adjacent to the vehicle 30 when the cage 100 is in the upright position and which lays on the bed 33 of the vehicle 30 when the cage 100 is in the layover position; an outside wall 120, which is opposite the inside wall 110 and away from the vehicle 30; a closeable front opening 130, which is partially closed by means of the front or head gate 300; and a closeable rear opening 140, which is partially closed by means of the entrance or pusher tail gate 400. The inside wall 110 includes a shoulder pad 370 at the front 113 of the inside wall 110 near the head gate 300. The shoulder pad 370 is configured to provide padding for the front shoulder of the animal 20 as it is in the cage 100 in the layover position. There is a feces grate 116 which is located near the back 114 of the inside wall 110 and is configured to roughly align with the tail and rectum of the animal 20 so that feces and urine can go out of the cage 100 should the animal defecate during the layover process. (This is not uncommon as the animals are often scared during the procedure.) There is a feces funnel 160, which is a four sided bevel walled funnel that allows the feces to exit the cage 100 and be deposited on the ground under the vehicle 30. There is a corresponding funnel opening 36 in the bed 33 of the vehicle that aligns with the feces funnel 160 so that the feces are deposited directly on the ground. The outside wall 120 includes a belly flipper or belly restraint 200 that is pivotally attached to the outside wall 120, and that rotates upward and inward to press against the animal's belly and pushes the animal 20 against the inside wall 110, essentially pinning the animal to the inside wall 110 to restrain it within the cage 100. The head gate 300 is mounted on the front 123 of the outside wall 120 and runs between the outside wall 120 to partially close the front opening 130. The rear gate 400 is pivotably mounted at the top 111 rear 114 of the inside wall 110 and the top 121 rear 124 of the outside wall 120 so that it swings down into the rear opening 140. There is a head rest 350 pivotably attached at the front 113 of the inside wall 110 that supports the animal's head when the cage 100 is in the layover position. There are four leg latches 500 mounted in a bottom rail system at the bottom of the cage 100 to secure the four legs of the animal 20 for trimming or inspection.

The inside wall 110 and the outside wall 120 are constructed from a series of parallel U-bars 170 that form a series of parallel ribs that provide the structure of the inside and outside walls. In the preferred embodiment the U-bars 170 are made from 2" nominal diameter schedule 40 steel pipe or tubing. The size and strength of the U-bars 170 can vary slightly, though for obvious reasons it is much preferable to use a heavier and stronger material than a weaker or narrower tubing. The U-bars 170 are tubes or bars that are bent in a flat bottom "U" shape with the two arms parallel to form the ribs of the walls. In the cage 100 the "U" is inverted, with the closed part at the top. The inside wall 110 is shown in detail in FIG. 3 and the outside wall 120 is shown in detail in FIG. 4. The various components of the inside wall 110 and the outside wall 120 are attached to U-bars 170. In the preferred embodiment there are seven U-bars 170, labeled 170a-170g in FIG. 3 & FIG. 4, with the first U-bar 170a at the front 130 of the cage 100 and the last 170g at the rear 140 of the cage 100. Each U-bar 170 is approximately 18 inches apart. In at least one embodiment of the invention there is a center beam 171 that runs along the top of the U-bars 170 and the length of the cage 100. In one configuration the center beam 171 is placed and welded across the top center of the U-bars 170, and in another configuration it is segmented and welded between the U-bars 170 at the center top. In at least one embodiment there is also an outside top beam 172 that runs along the top 121 of the outside wall 120 to provide additional structural support to the outside wall 120. The top beam 172 is segmented and welded between the U-bars 170 along the top 121 of the outside wall 120. Both the center beam 171 and the top beam 172 are made from the same tubing material as the U-bars 170. The use of the U-bars 170 means that the two sides of the cage 100 are made from a single piece of material, so there are no connection points between the inside wall 110 and the outside wall 120 to weaken and deteriorate. Assembling the inside wall 110 and the outside wall 120 with a series of parallel U-bars 170a-170g provides structural support to strengthen the cage 100.

Figure 3:
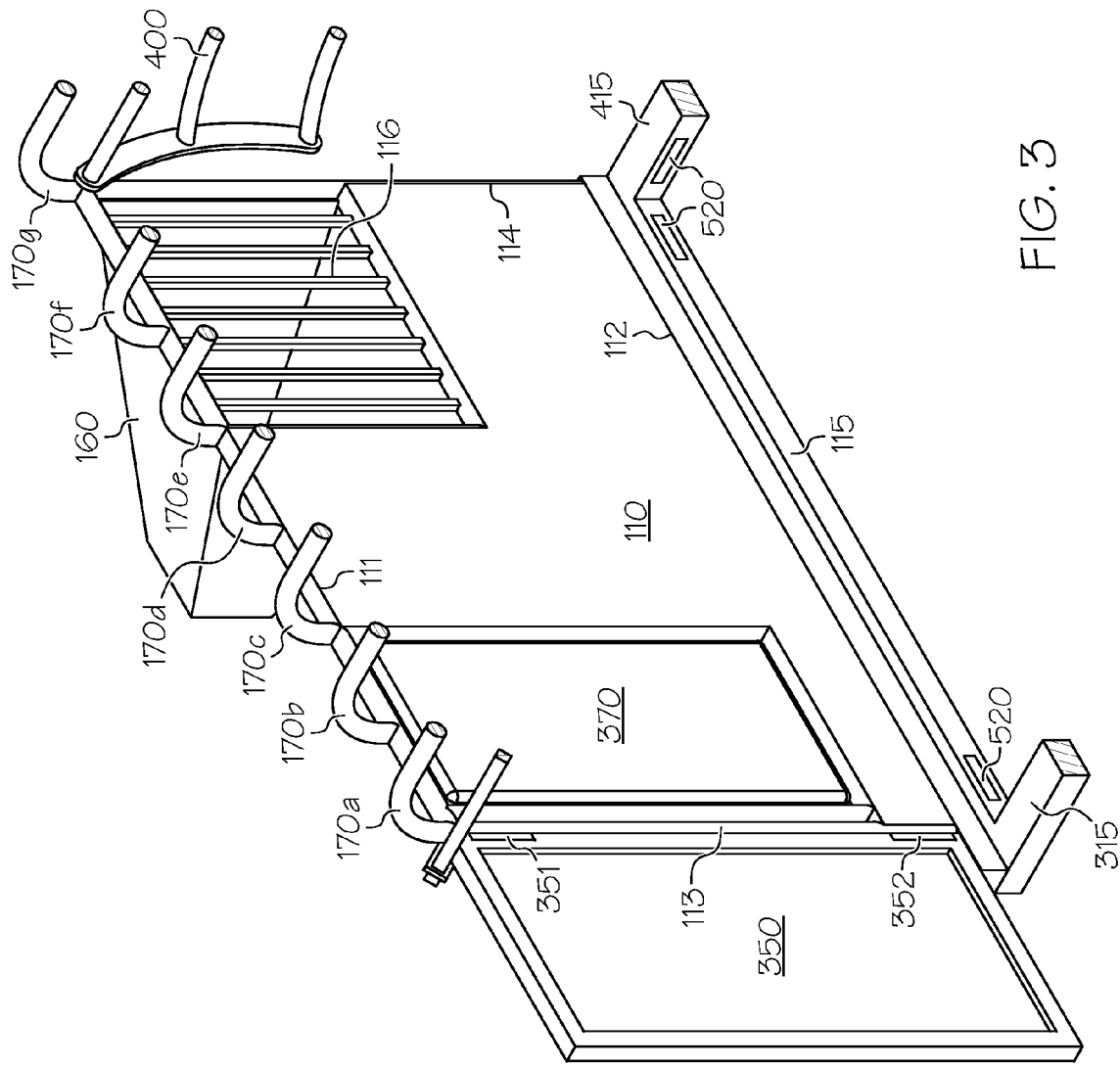
FIG. 3 is a perspective cut away view showing the inside wall of the cage.

The inside wall 110, as shown in FIG. 3, has a front 113, a back 114, a top 111 and a bottom 112. There is an inside bottom rail 115 mounted at the bottom 112 of the inside wall 110. The inside bottom rail 115 is attached to the bottom of each of the U-bars 170a-170g by butt welding, or other suitable means, including bolting. The inside wall 110 is constructed from a series of ribs which are the bottom portion of the U-bars 170. In the preferred embodiment there are 7 U-bars 170a-170g that form the main structural component of the inside wall 110. There is a sheet of ⅛" steel plating that is welded over the U-bars 170 to form the actual wall structure of the inside wall 110, and that provides a flat surface for the animal 20 to lay upon when the cage 100 is in the layover position. There are two spaces cut out of the steel plating on the inside wall 110. At the front 113 of the inside wall 110 there is a cut out of the steel sheet, and a space between the first 170a and third 170 c rib, where the shoulder pad 370 is mounted. The shoulder pad 370 is approximately three feet wide by four feet tall, though these dimensions can vary, and is made of a standard air bladder. The air bladder is mounted on the two sides between the steel plate and the first 170a and third 170g U-bar 170 rib. The air bladder is fillable through a standard air valve and when filled creates a cushion for the shoulder of the animal. The position of the shoulder pad 370 corresponds to the approximate position of the shoulder of the animal 20 while inside the cage 100. Cattle do not normally lay on their sides and so their skeletal and muscle structure is not designed to support their weight when on their side. Therefore, when the cage 100 is placed in the layover position, the animal's shoulder will lay upon the shoulder pad 370, which will prevent or minimize injury to the animal 20.

There is a second cut out of the metal plate at the top 111 rear 114 of the inside wall 110, positioned between the fifth 170e and seventh U-bar 170g rib. This opening is approximately 3 foot by 3 foot, though the dimensions can vary, and the opening is covered by a series of narrow parallel bars to produce the feces grate 116. The feces grate 116 is aligned with the anus of the animal 20 such that when the cage 100 is in the layover position, any feces or urine will go out of the cage 100 to prevent fouling the cage 100 or the work area. There is a feces funnel 160 mounted to the backside of the inside wall 110. In the preferred embodiment the feces funnel 160 is a simple beveled four sided funnel with an open end, which is configured to allow any feces or urine to flow out of the cage 100 and onto the ground. The feces funnel 160 is welded to the backside of the inside wall 110.

There is an inside hollow bottom rail 115 mounted on the bottom 112 of the inside wall 110. The hollow bottom rail 115 is constructed of ⅛ inch steel plating, and in the preferred embodiment is 3"×5" rectangular tube, with the interior hollow, which allows the placement of the leg latches 500 within the hollow bottom rail 115. The bending and production of such hollow rectangular steel tubing is well known. The hollow bottom rail 115 is welded to the bottom 112 of the inside wall 110, with the 5" wide side against the bottom of the U-bars 170. In some cases there is an intermediate bottom bar welded to the bottoms of the U-bars 170 to provide structural support, which is then attached to the inside hollow bottom rail 115, but in other cases the U-bars 170 are attached directly to the inside hollow bottom rail 115. In one embodiment the inside bottom rail 115 runs only the length of the inside wall 110 from the front to the back. In an alternate embodiment the inside bottom rail 115 is made from the same piece of material as the front bottom rail 315 and the rear bottom rail 415, which gives the cage 100 additional structural support.

Figure 4:
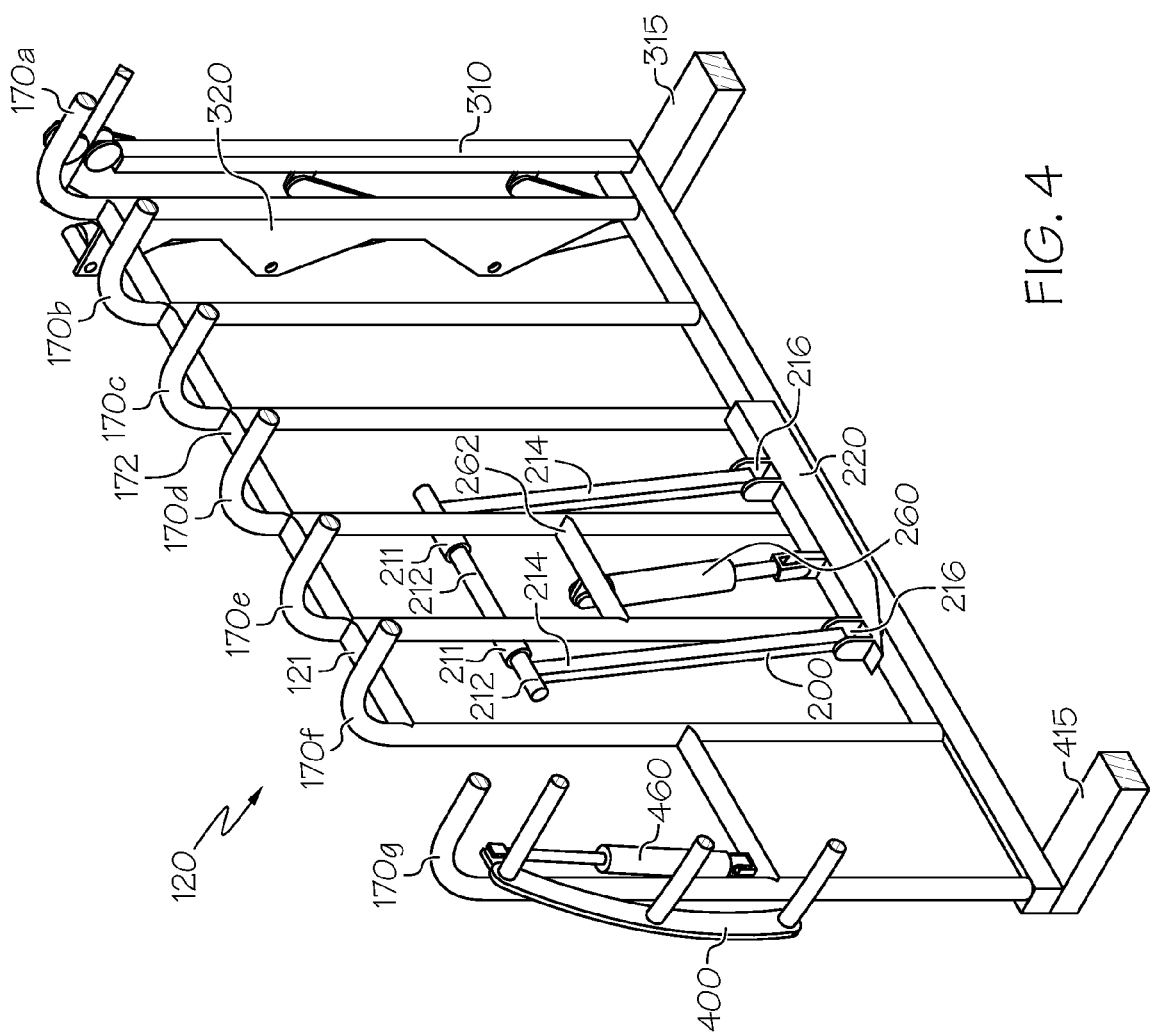
FIG. 4 is a perspective cut away view showing the outside wall of the cage.

The outside wall 120, as shown in detail in FIG. 4, has a front 123, a back 124, a top 121, and a bottom 122. The outside wall 120 is configured from the same series of parallel U-bars 170 that create ribs that form the inside wall 110. In the preferred embodiment the outside wall 120 is configured from seven U-bars 170a to 170g. There is a top rail 172 that runs along the top 121 of the outside wall 120 and is welded between the U-bars 170 to provide structural support and to form the wall. The top rail 172 is made from the same tubing as the U-bars 170. There is an outside bottom rail 125 that runs along the bottom 122 of the outside wall 120 to structurally form the wall, and that is welded to the bottoms of the U-bars 170. In one embodiment the outside bottom rail 125 is made from the same 3"×5" rectangular tubing as the inside bottom rail 115. There are no leg latches 500 in the bottom 122 of the outside wall 120 as this wall will be above the animal 20 when the cage 100 is in the layover position, so the bottom rail 125 does not need to be hollow.

There is a belly restrain 200 mounted on the outside wall 120. The belly restrain 200 consists of a belly bar 220 which is a flat bar about six inches wide, two feet long, and roughly four inches thick. The belly bar 220 is rotatably attached to the bottoms of two stabilizers 214 which are attached by means of two hinges 216 located near the ends of the belly bar 220. The tops of the two stabilizers 214 are attached to a rotator bar 212 that is mounted within two hinge tubes 211 that allow the rotator bar 212 to rotate within the hinge tubes 211. In the preferred embodiment the hinge tubes 211 are located on the back side of the fifth 170e and sixth 170f U-bars. The hinge tubes 211 are located approximately three quarters of the way up the U-bars 170 e and 170 f. The rotator bar 212 is cylindrical and rotates within the hinge tubes 211 to allow the stabilizers 214 to rotate. There is a belly restraint piston 260 that is pivotally attached at one end to the center of the belly bar 220 by means of a hinge and pin, and attached at the other end to the belly restrain piston mount 262. The belly restrain piston mount 262 is a bar or tube that is welded between U-bars 170e and 170f, and located at about the halfway point of the U-bars 170e and 170f. When the belly restraint piston 260 is activated and the piston extends it forces the belly bar 220 to rotate inward and upward into the inside space of the cage 100 to press upwardly (when the animal is standing) and toward the inside wall 110. This allows the belly bar 220 to press the animal 20 against the inside wall 110 to secure the animal 20 in place within the cage 100, which prevents the animal from moving or sliding when the cage 100 is rotated into the layover position. The belly restrain piston 260 is a standard piston with a 2" bore with an 8" stroke. The piston 260 is connected to a central hydraulic reservoir by means of standard hydraulic tubing. The central hydraulic reservoir provides pressure to the pistons, and uses remotely controlled servo motors to control the pressure. The servo motors are controlled remotely by the appropriate button on the hand held controller 600 as described below. Use of such remotely controlled hydraulic systems is well know. When the button in pressed and the servo motor activates the piston, pressure is applied and the piston extends, allowing movement of the belly bar 220.

Figure 5:
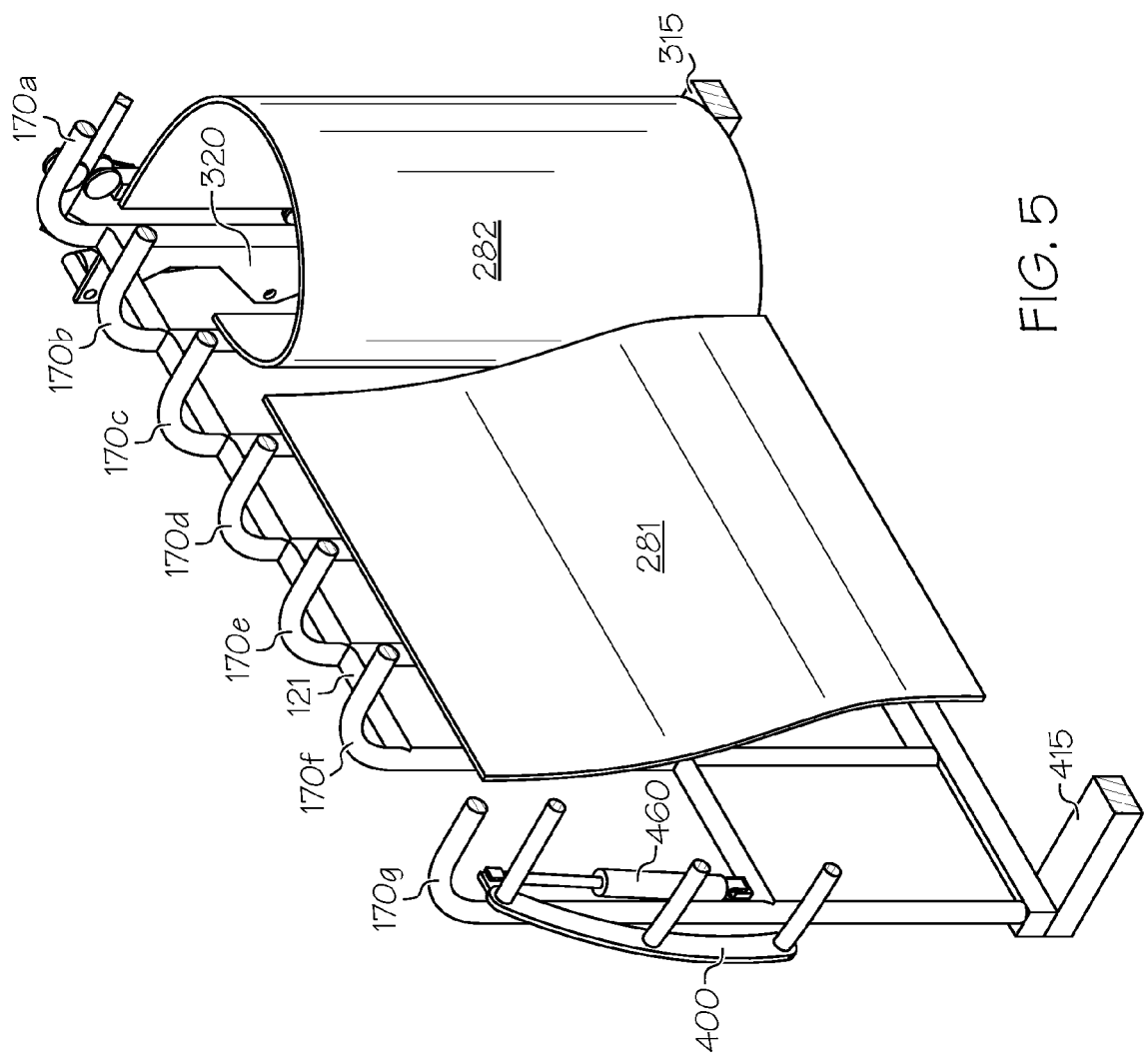
FIG. 5 is a perspective cut away view showing the outside wall covered by protective padding.

In the preferred embodiment there is are two sheets of flexible rubberized matting that are attached to the outside wall 120 as shown in FIG. 5. The rubberized sheets 281 and 282 are preferably made from standard ½" (one-half inch) conveyor belt matting, and are designed to prevent the animal 20 from attempting to stick its head between the U-bar 170 ribs of the outside wall 120, and to protect the animal 20 from any of the components mounted on the outside wall 120, and that may have sharp edges. Other suitably flexible and sturdy matting material may be used. The first sheet 281 is attached to the top of the third U-bar 170c and the sixth U-bar 170f by means of standard screws or bolts, or any suitable manner, and it hangs over the belly restraint 220. The first sheet 281 is designed to be pressed inwardly when the bell bar 220 is activated and rotates into the inside of the cage 100. In the preferred embodiment it is the rubber matting that actually touches the animal 20 when the belly bar 220 is activated. There is a second sheet of matting 282 that is attached to the top and bottom of the second U-bar 170b on one edge, and attached to the inside of the gate post 310 on the other edge. The matting 282 is attached by means of screws or bolts, but can be attached in any suitable manner. This protects the animal 20 from sticking its head between the U-bars 170 that are past the first sheet 281, or pressing its nose or head into the movable components of the front gate 300.

Figure 7:
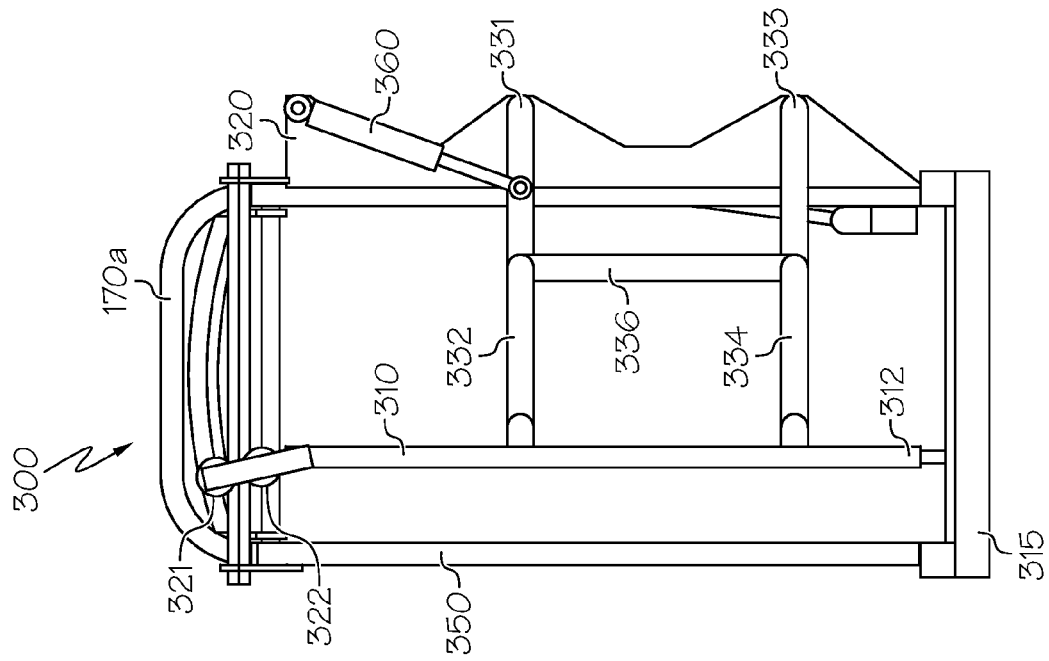
FIG. 7 is a front elevation detail view of the front or head gate in the closed position.
Figure 6:
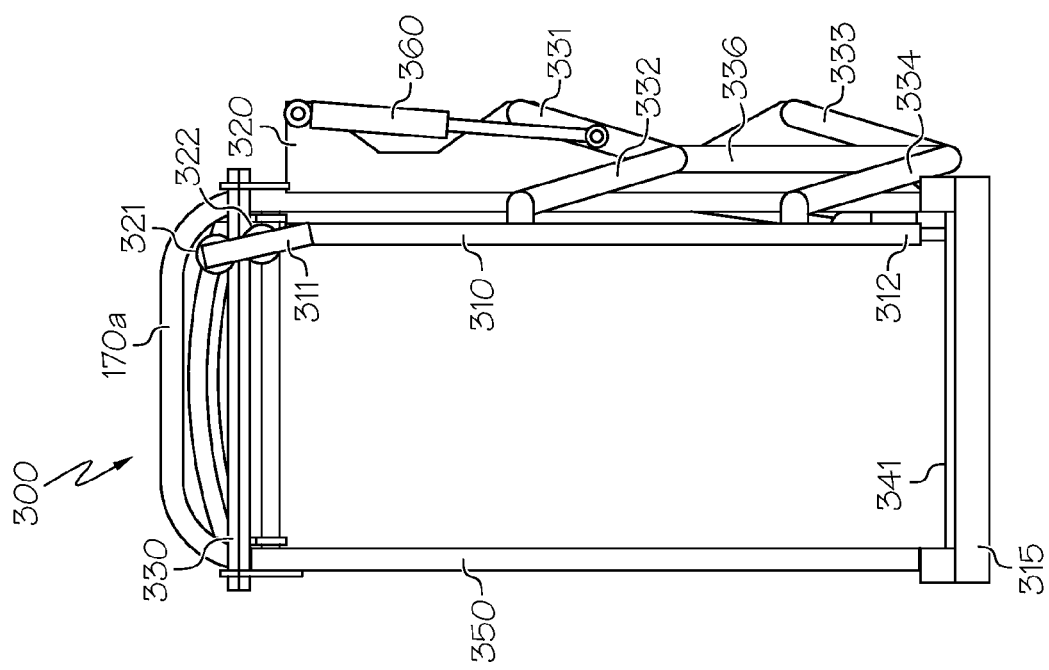
FIG. 6 is a front elevation detail view of the front or head gate in the open position.

FIG. 6 is a detail of the front or head gate 300 in the open position, and FIG. 7 is a detail of the head gate 300 in the closed position. Components of the head gate 300 can also be seen in FIG. 1. The head gate 300 is located at the front of the cage 100 and partially closes the front opening 130. It is referred to herein as the head gate 300 because that is standard in the industry because the animal's head 24 extends through the gate. The head gate 300 opens to allow the animal 20 to leave the chute 100, and closes to restrain the animal 20 within the chute 100. The head gate 300 is movable between and open and a closed position. In any configuration of the head gate 300, when the head gate 300 is in the closed position there is a slight gap between the edge of the gate post 310 and the front 113 of this inside wall 110, which is slightly wider than the animal's neck, but not wider than the animal's head or shoulders. This gap, as best seen in the closed front gate 300 view of FIG. 7, can be between about 8 inches and about 16 inches depending upon the size of the animals typically trimmed. This allows the animal's head to extend from the head gate 300 without choking the animal, but prevents the animal 20 from moving out of the cage 100 or pulling its head into the cage.

The head gate 300 is primarily mounted on a mounting plate 320, which is a ⅛" steel plate that runs the entire height of the chute 100 and is securely attached to the front 123 of the outside wall 120. The mounting plate 320 is attached to the first U-bar 170a by means of welding, but it could also be bolted or attached in other conventional and secure means. The mounting plate 320 is flat on the edge attached to the first U-bar 170a, and undulating on the other edge, with three raised portions where the gate 300 controlling mechanisms are attached.

The head gate 300 consists of the movable gate post 310 that moves from the open to the closed position. It is the gate post 310 that engages the neck of the animal 20 to restrain the animal within the cage 100. At the top 311 of the gate post 310 there are two spaced rollers, a top roller 321 and a bottom roller 322. The rollers 321 and 322 roll on a gate rail 330. The gate rail 330 is a bar or tube that is mounted between the top 111 front 113 of the inside wall 130 and top 121 front 123 of the outside wall 120. In the preferred embodiment the gate rail 330 is mounted to the inside wall 110 and outside wall 120 by means of a standard bracket, but it is possible to mount the gate rail by means of welding or other suitable means. The top roller 321 and bottom roller 322 are standard rollers with a concave cross section so that the gate rail 330 is disposed within the concave portion of both the top roller 321 and the bottom roller 322. There are two rollers to ensure the smooth rolling of the rollers and therefore the smooth movement of the gate post 310 as it moves between the open and closed positions.

At the bottom of the front gate 300 there is a front bottom bar 315 that is attached between the bottom 112 front 113 of the inside wall 110 and the bottom 122 front 123 of the outside wall 120. The front bottom bar 315 is made from the same 3"×5" rectangular tubing as the inside hollow bottom rail 115. The front bottom bar 315 includes a slider channel 341 that runs lengthwise through the bar and has a slider opening 342 on the top of the front bottom bar 315. At the bottom 312 of the gate post 310 there is a t-prong 313 that sits within the slider channel 341, and slides from the opened to the closed positions.

The gate post 310 is attached to the mounting plate 320 by means of two parallel control arms 331, 332 and 333, 334. The middle mount control arm 331 is rotatably mounted at one end to the mounting plate 320 by means of a hinge, and is rotatably attached to the middle post control arm 332 by means of a hinge. The middle post control arm 332 is attached to the gate post 310 at the other end. There is an attachment tab with a hinge on the gate post 310 where the middle post control arm 332 is attached. The bottom mount control arm 333 is rotatably mounted at one end to the mounting plate 320 by means of a hinge, and is rotatably attached to the bottom post control arm 332 by means of a hinge. The bottom post control arm 332 is attached to the gate post 310 at the other end. There is an attachment tab with a hinge on the gate post 310 where the bottom post control arm 332 is attached. There is a spacer arm 336 rotatably attached between the hinge where the middle mount control arm 331 is attached to the middle post control arm 332, and the hinge where the bottom mount control arm 333 is attached to the bottom post control arm 334. This ensure that the control arms move in synch. There is a hydraulic head gate control piston 360 rotatably mounted at the top of the mounting plate 320, and rotatably attached at the middle of the middle mount control arm 331. The head gate controller piston 360 is a standard 2" bore by 6" stroke piston that is attached to a central reservoir by means of hydraulic tubing, and manipulated by means of remotely controlled servo motors that are controlled by the appropriate buttons on the hand held remote controller 600, as described below. When the piston 360 extends the middle mount control arm 331 is rotated downwardly, which pulls the middle post control arm 332 and which opens the head gate 300. The spacer arm 336 ensures that the bottom controller arms 333 and 334 act in parallel with the middle controller arms 331 and 332 to ensure the even and smooth movement of the gate post 310. As the arms activate and the gate post 310 moves, the rollers 321 and 322 roll on the gate rail and the t-prong 313 slide in the slider channel 341.

Figure 9:
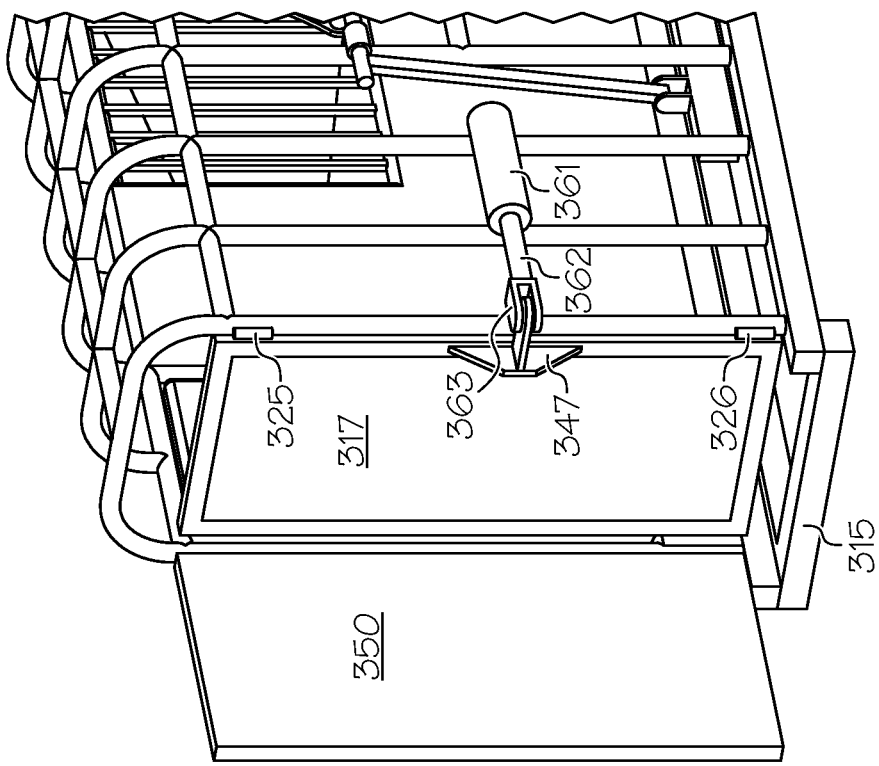
FIG. 9 is a front perspective view of a second embodiment of the head gate in the closed position.
Figure 8:
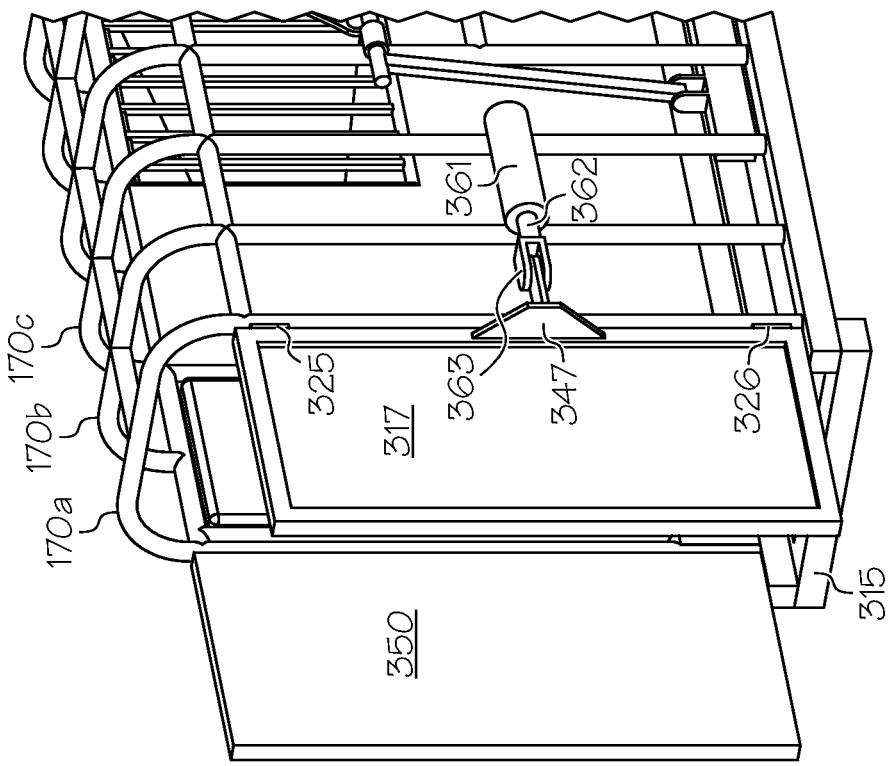
FIG. 8 is a front perspective view of a second embodiment of the head gate in the open position.

There is an alternate version of the head gate 300 which is shown in FIG. 8 and FIG. 9. In this embodiment the head gate 300 is a swinging door 317 that rotates about a top hinge 325 mounted at the top 121 of the front opening 130, and a bottom hinge 326 mounted at the bottom 122 of the front 123 of the outside wall 120. The swinging door 317 has a metal frame that is as tall as the front opening 130, and not as wide as the front opening so that there is a gap between the edge of the swinging door 317 and the inside edge of the front opening 130. This gap is the same as the gap for the preferred embodiment of the front gate 300, of between 8 and 16 inches, which is sized to be narrower than an animal's head or shoulders, but not as narrow as the animal's neck, so that the animals head can extend trough the head gate 300 without being chocked, but while restraining the animal's head in the head gate 300. In this configuration the front gate controller piston 360 is mounted to swing this version of the head gate 300 opened and closed. The cylinder 361 of the front gate control piston 360 is mounted about half way up on the backside of the third U-bar 170c, and the rod 362 is mounted to a hinge 363 attached to a bracket 347 that is mounted to the middle of the head gate 300. When the front gate control piston 360 extends it pushed the bracket 347, which closes the head gate 300, and when the piston retracts it pulls the bracket 347, which opens the head gate 300.

There is a head rest 350, which is pivotally attached by hinges to the front 113 of the inside wall 110. The head rest 350 is best seen in FIG. 1 and FIG. 3, with the rear of the head rest 350 with control piston 356 shown in FIG. 10. The head rest 350 is pivotably mounted to the inside of the first U-bar 170a by two hinges, a top hinge 351 attached at the top 111 of the front 113 of the inside wall 110 and a bottom hinge 352 attached to the bottom 112 of the front 113 of the inside wall 110. When the head rest 350 is in the open position it is planar with the inside wall 110 so that it provides support for the animal's head 24 when the cage 100 is in the layover position. The head rest 350 folds into a closed position for transporting the chute 10. [Not shown.] In the closed position the head rest 350 is at an approximately 90 degree angle from the inside wall 110 and is closed over the head gate 300. The head rest 350 is hydraulically controlled by a head rest hydraulic control piston 356 which is a standard 2" bore 4" stroke piston. The head rest control piston 356 is rotatably mounted on one end to the outside bottom of the third U-bar 170c, and rotatably mounted to a tab attached to the bottom of the head rest 350 near the bottom hinge 352. The head rest control piston 356 is attached to a central reservoir with standard hydraulic tubing and is controlled by means of remote controlled servo motors remotely controlled by means of the hand held remote control unit 600.

Figure 12:
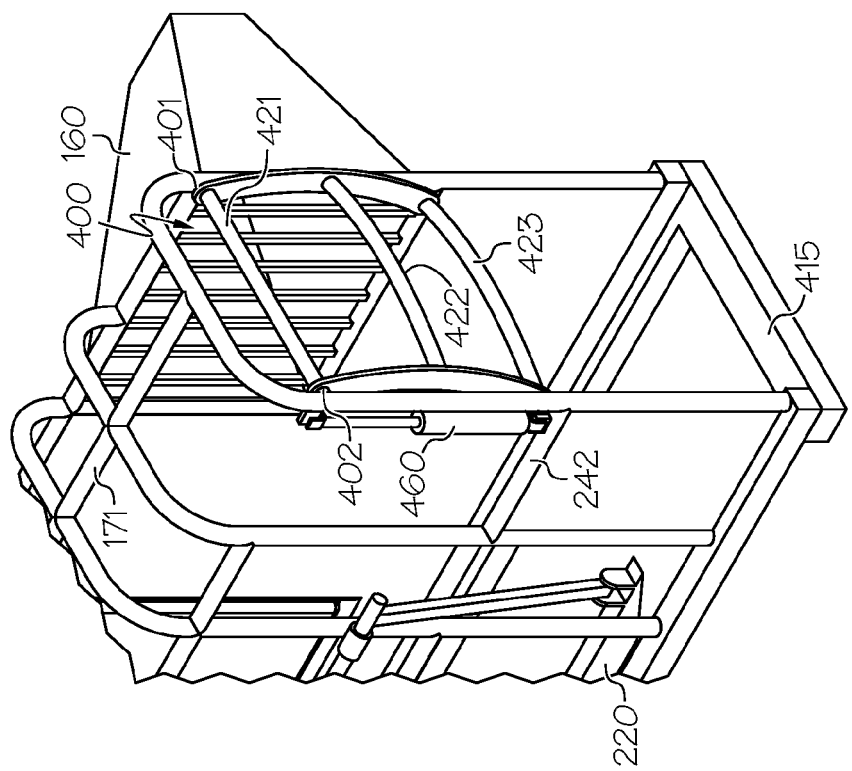
FIG. 12 is a detail perspective view of the rear or cow pusher gate in the closed position.
Figure 11:
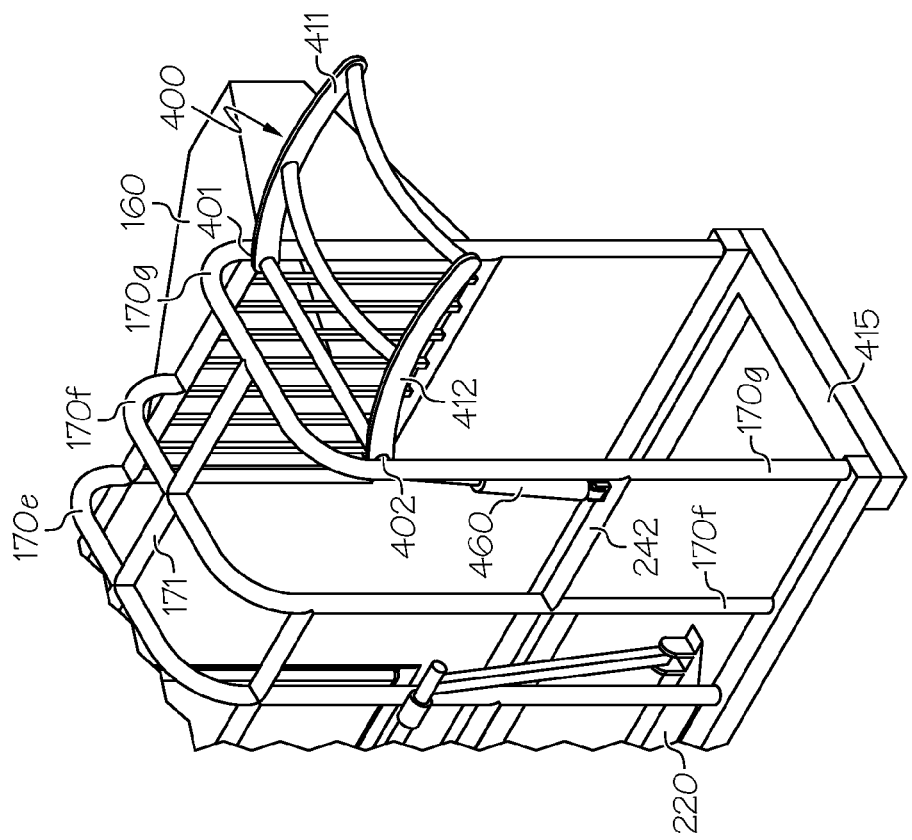
FIG. 11 is a detailed perspective view of the rear or cow pusher gate in the open position.

The "tail pusher" rear gate 400 is shown in FIG. 11, which is a detail view of the cage back 140 with the rear gate 400 in the open position, and FIG. 12 is a detail view of the cage back 140 with the rear gate 400 in the closed position. It can also be seen in perspective in the closed position in FIG. 1 and FIG. 2. The rear gate 400 is rotatably mounted on two hinges 401 and 402, with the first hinge 401 mounted on the top 111 of the back 114 of the inside wall 110, and the second hinge 402 mounted on the top 121 of the back 124 of the outside wall 120. The hinges are standard ⅝" sealed brass hinges. The rear gate 400 swings down into position to close the otherwise open cage back 140 to prevent the animal from backing out of the cage 100, or in some cases to push the tail of the animal to urge it forward into the cage 100. The rear gate 400 encloses the top half of the open cage back 140 which is sufficient to prevent an animal 20 from backing out of the cage 100. In addition, the rear gate 400 can swing down to push the animal 20 forward into the cage 100. The rear gate 400 consists of two parallel gate arms 411 and 412 that are slightly concave, and three cross bars 421, 422 and 423 that run parallel and between the two gate arms 411 and 412. The top cross bar 421 is straight and runs directly between the first hinge 401 and the second hinge 402. The middle cross bar 422 and bottom cross bar 423 are concave, protruding outwardly slightly such that it will cup the animal's hindquarters when entering the cage 100. This prevents the animal 20 from sliding to one side or the other across the rear gate 400 and eliminates the potential that the rear gate 400 will not fully engage the animal 20. The rear gate 400 is controlled by the rear gate hydraulic control piston 460. The rear gate hydraulic control piston 460 is rotatably mounted on the backside of the rear cross bar 242 and rotatably mounted on a rear gate bracket 464 such that when the rod of the rear gate hydraulic control piston is withdrawn the rear gate 400 opens, and when it extends the rear gate 400 closes.

There is a rear bottom channel bar 415 that runs across the bottom of the open cage back 140. The rear bottom channel bar 415 is a 3" by 5" hollow bar made to the same specifications as the inside bottom rail 115, and is hollow to incorporate one of the leg latches 500. In one configuration the rear bottom channel bar 415 is permanently affixed between the rear 113 bottom 112 of the inside wall 110 and the rear 123 bottom 122 of the outside wall 120. In a second embodiment the rear bottom channel bar 415 is pivotally mounted to the rear 113 bottom 112 of the inside wall 110 and rotates outward to open the bottom of the rear opening 140. In this configuration the rear bottom channel bar 415 is controlled by a piston. In this configuration the rear bottom channel bar 415 rotates in synch with the rear gate 400, such that when the rear gate 400 is in the open position the rear bottom channel bar 415 is also in the open position, and when the rear gate 400 is in the closed position the rear bottom channel bar 415 is also in the closed position. This second configuration is required because cattle that spend their lives in barns and stalls are not used to walking and stepping over an obstruction, and so will not raise their feet to cross a barrier. Therefore, the rear bottom channel bar 415 swings out of the way to allow the animal to walk into the cage 100 without the obstruction to its feet.

Figure 13:
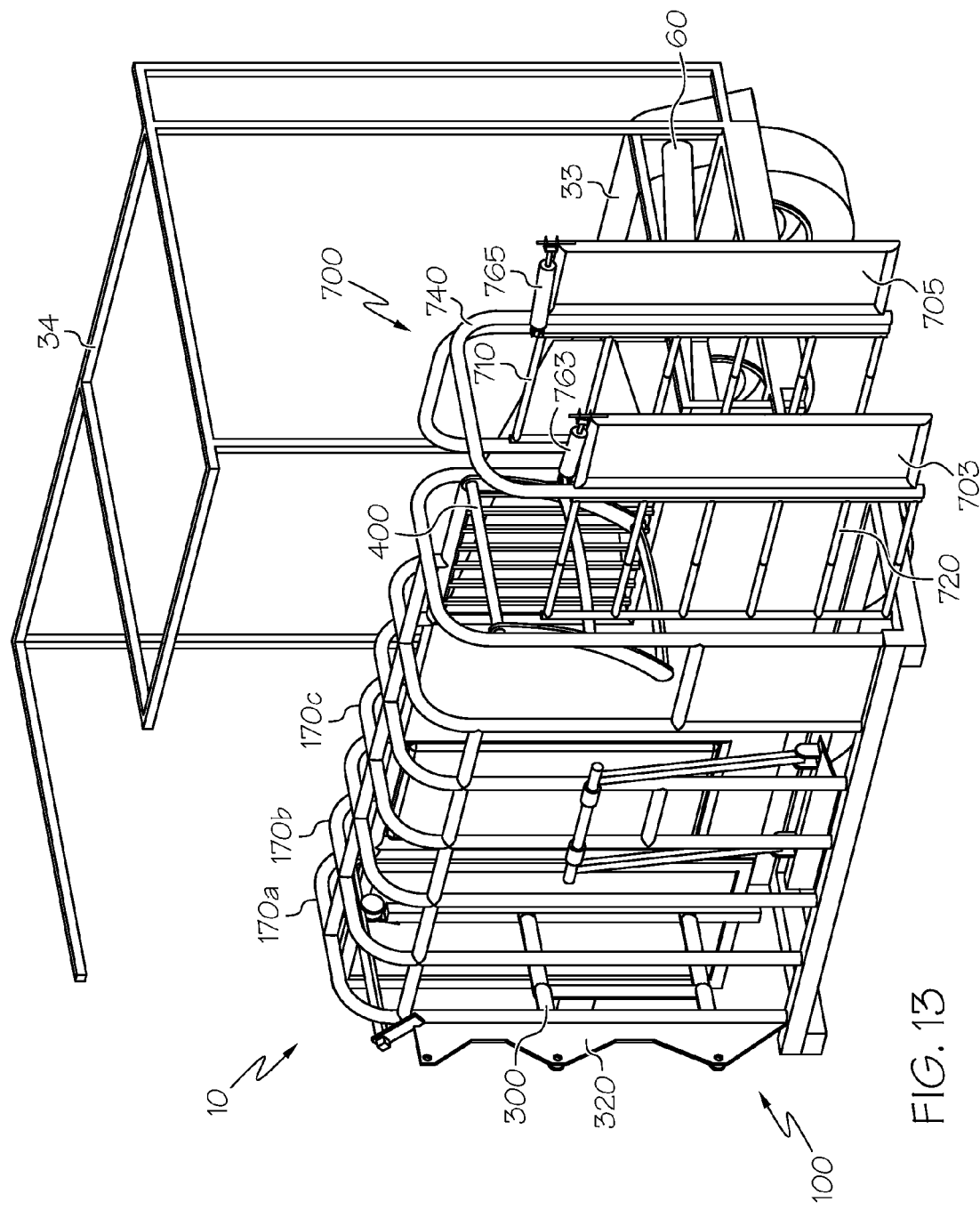
FIG. 13 is a rear elevation view of the chute in the standing or vertical position, and with the rear staging area door in the open position.
Figure 14:
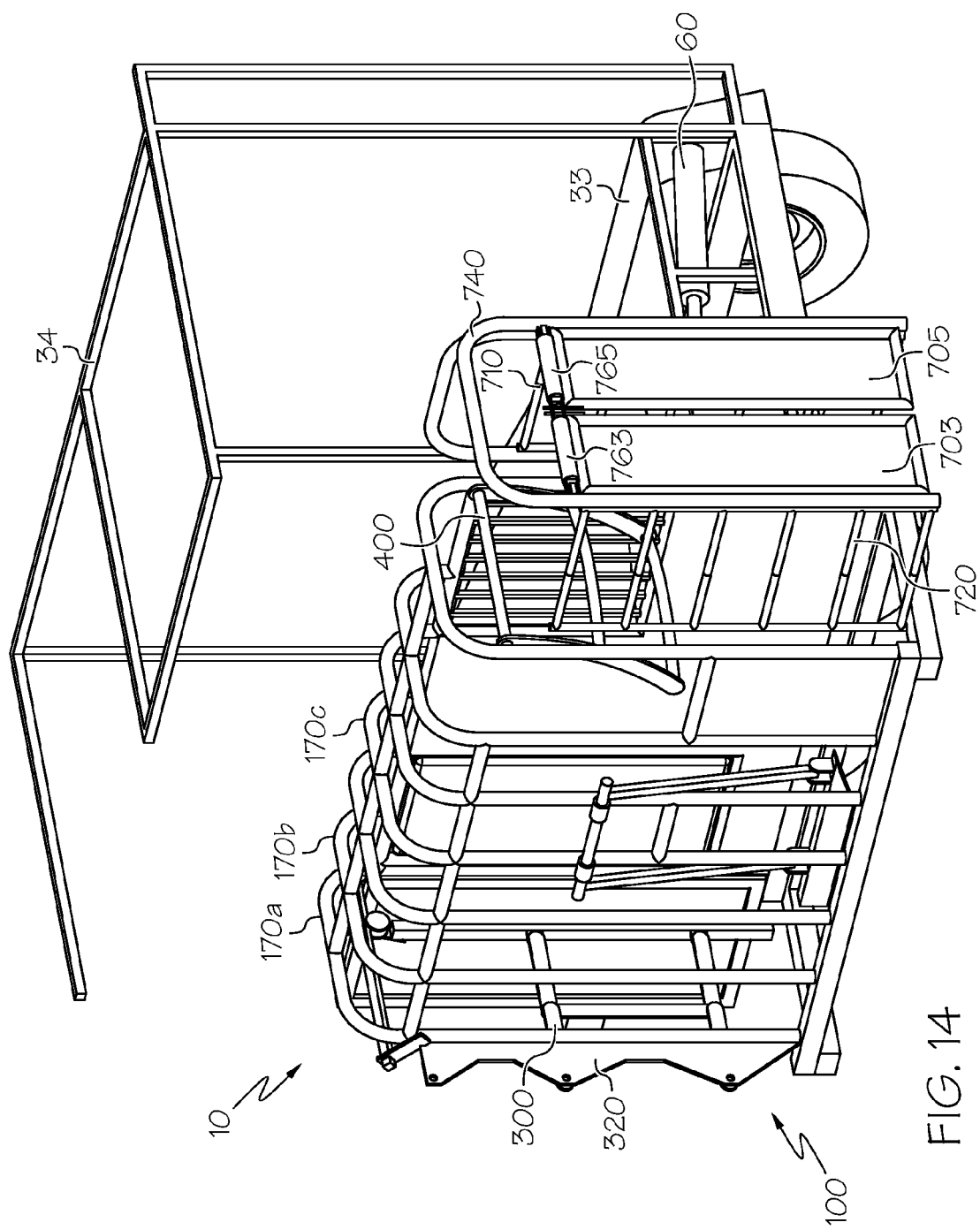
FIG. 14 is a rear elevation view of the chute in the vertical position, and with the rear staging area door in the closed position.

There is a staging area 700 located at the rear of the cage 100. The staging area 700 allows the operator to position incoming animals away from the operational components of the chute 10, and then manage the movement of the animals 20 into the cage 100. The staging area 700 allows the operator to easily and effectively manage the flow of the cows, one at a time, through the chute 10 to have their hooves trimmed. The staging area 700 can be seen in perspective in FIG. 2 and FIG. 19, with FIG. 13 a detail front view of the rear of the staging area 700 showing the staging area doors 703 and 705 in the open position, and FIG. 14 a detail view of the rear of the staging area 700 showing the staging area doors 703 and 705 in the closed position. The staging area 700 is a three sided enclosure, with one side openably closed by means of the two swinging staging area doors 703 and 705. The two sides of the staging area 700 are closed by an inside fence 710 and an outside fence 720. The inside fence 710 is planar with the inside wall 110 and the outside fence 720 is planar with the outside wall 120 so that, when the rear gate 400 is opened, a cow can be easily herded into the cage 100. The inside fence 710 and outside fence 720 have a series of parallel cross beams to ensure that the animals 20 do not get out of the staging area 700. There is a rear frame 740 attached between the inside fence and the outside fence 720, and the two staging area doors 703 and 705 are rotatably attached to the rear frame 740 by means of standard hinges. In the preferred embodiment the rear frame 740 is the same as the U-bars 170. It is made from the same material and in the same configuration as the U-bars 170. When the staging area doors 703 and 705 are opened the staging area 700 creates a narrow walkway to funnel animals 20 into the cage 100.

There are two staging area door hydraulic controlling pistons 763 and 765 that move the doors between the open to the closed positions. The controlling pistons for the staging area doors 703 and 705 are both 1½" bore, 4" stroke pistons. The staging area door hydraulic control pistons 763 and 765 are controlled by the same remotely controlled hydraulic control system as all of the other hydraulic controlling pistons. The staging area doors 703 and 705 are rotatably mounted on the rear frame 740 by hinges mounted at the top and bottom of the doors 703 and 705. The hinges are located on the backside of the rear frame 740 such that doors 703 and 705 will be unable to swing inwardly towards the rear gate 400. The staging area doors 703 and 705 swing outward from the chute 10 and into the narrow walkway, which prevents the doors 703 and 705 from being forced open by an animal. The doors are constructed of 2" tubing that comprises the frame of the door. In one configuration the doors 703 and 705 are covered with sheet metal, and in another configuration the doors 703 and 705 are covered with the standard ½" matting used elsewhere in the chute 10.

In typical operation cattle are funneled into the chute 10 by means of narrow fencing which allows one animal at a time to walk into position. Animals are lined up in between these narrow fences. These narrow fences are commonly referred to as chutes, but because the word chute as used herein has a specialized meaning, these funneling gates will simply be referred to as narrow walkways. The staging area 700 separates the waiting animals in the narrow walkways from the moving components of the chute 10, which allows the hoof trimmer to more easily manage the animals. There are standard fencing attachments mounted on either side of the rear frame 740, and the fencing for the narrow walkway is attached to the staging area 700 by means of these standard attachments. The staging area doors 703 and 705 are a few feet behind the rear opening 140 to keep the animals away from the rear gate 400 when it swings down into the closed position. The staging area 700 allows the rear gate 400 to rotate upward and downward without hitting the next animal waiting for its turn in the chute 10. The staging area 700 allows the operator or hoof trimmer to easily manage the animals and control the flow of the cows through the chute 10 and the hoof trimming process.

The staging area 700 is rotatably mounted to the vehicle 30 such that it can be rotated up and onto the flat bed 33 for transportation. In one embodiment there is a hydraulic piston that will automatically rotate the staging area 700, while in another embodiment the staging area 700 is rotated by hand. The staging area 700 is attached to the bed 33 by means of a hinge that is attached to the inside fence 710, and which allows the staging area 700 to be rotated onto the bed 33. In the stationary platform mounted embodiment of the invention the staging area 700 can be mounted in a stationary position at the rear of the layover chute 10, or can be rotatably mounted to save space in the hoof trimming area.

Figure 15:
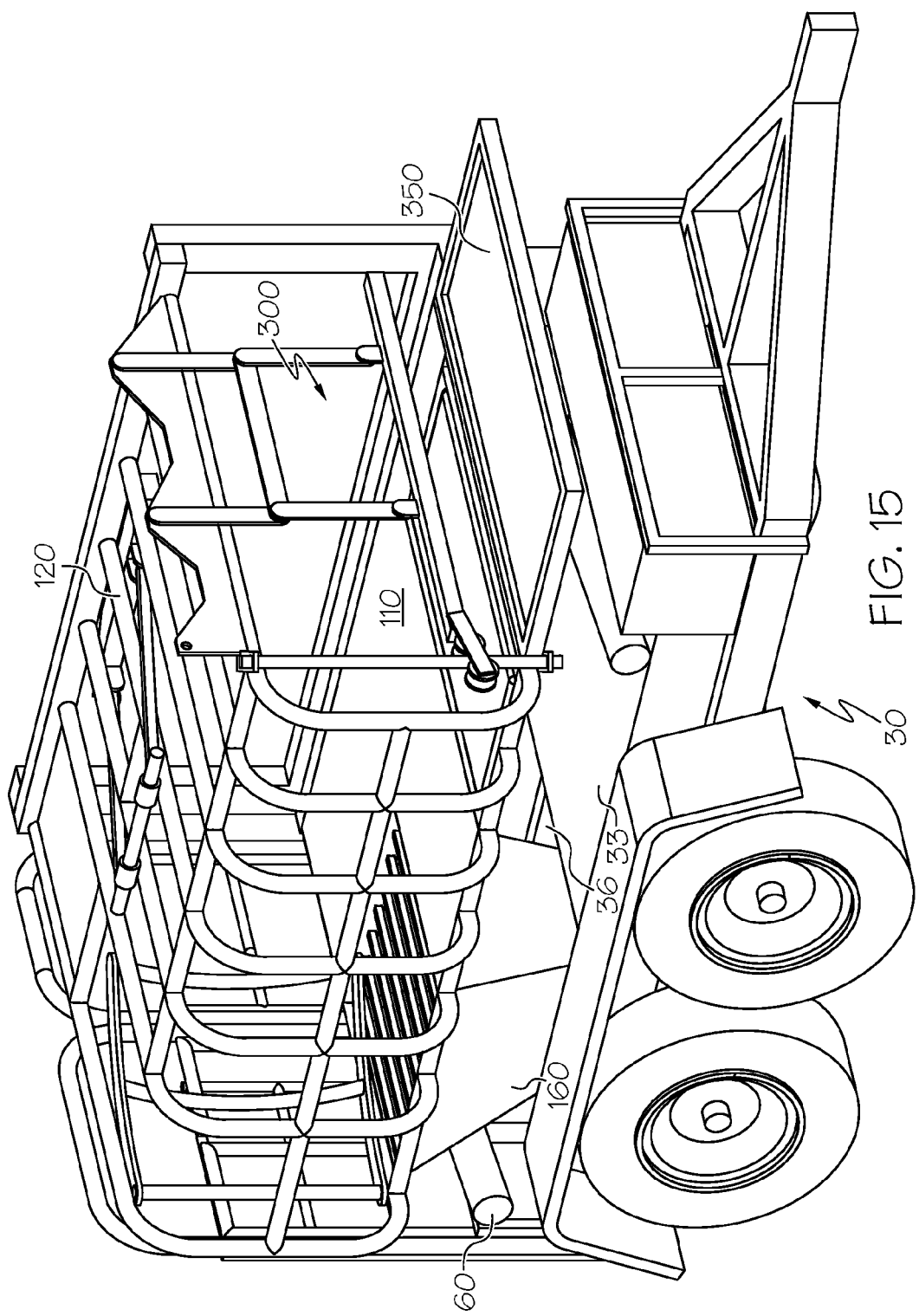
FIG. 15 is rear elevation view of the vehicle with the chute in the horizontal, or layover position on the vehicle.

FIG. 15 is a perspective view of the rear of the chute 10, showing the cage 100 in the vertical or layover position and resting on the bed 33 of the vehicle 30. In this view it is seen that the feces funnel 160 extends through the funnel opening 36 in the bed 33 of the vehicle 30 to allow feces to be deposited directly onto the ground. There are two main layover pistons 60, one located at the front of the cage 100 and the other located at the rear of the cage 100. The pistons 60 move the cage 100 from the upright to the layover position. The pistons are 2" bore, 30" stroke pistons and are controlled by remote controlled servo motors which are controlled by the hand held remote control 600. When there is an animal 20 in the cage 100, the animal's legs will be extending outward from the bottom of the cage 100. This is the position for trimming the hooves of the animals, and there are four integrated leg latches 500 to secure the legs for trimming. In this position the animals head will be extending through the head gate 300 and laying on the head rest 350.

Figure 16:
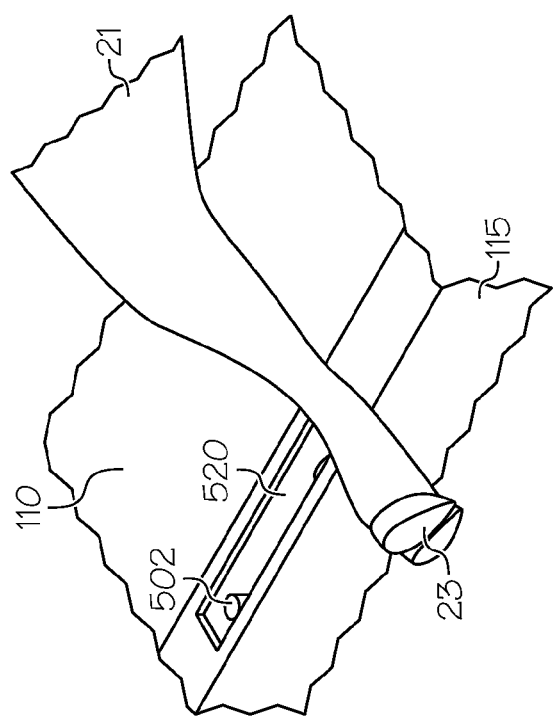
FIG. 16 is a detail of the leg latch in the open position.
Figure 17:
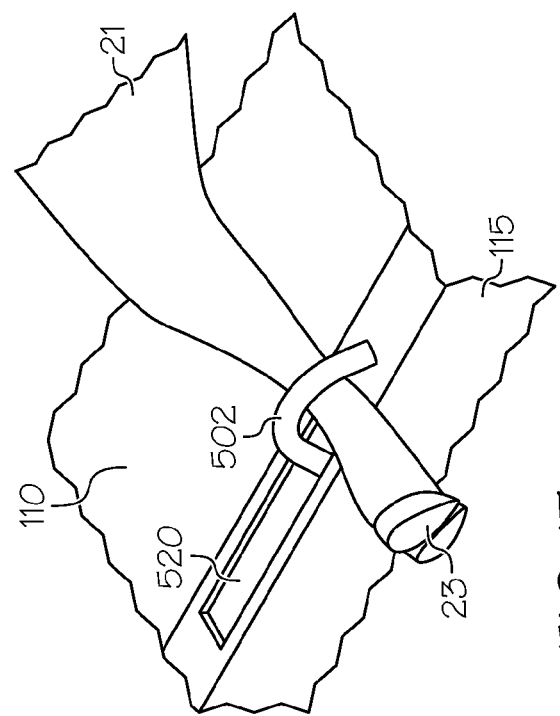
FIG. 17 is a detail of the leg latch in the closed position.
Figure 18:
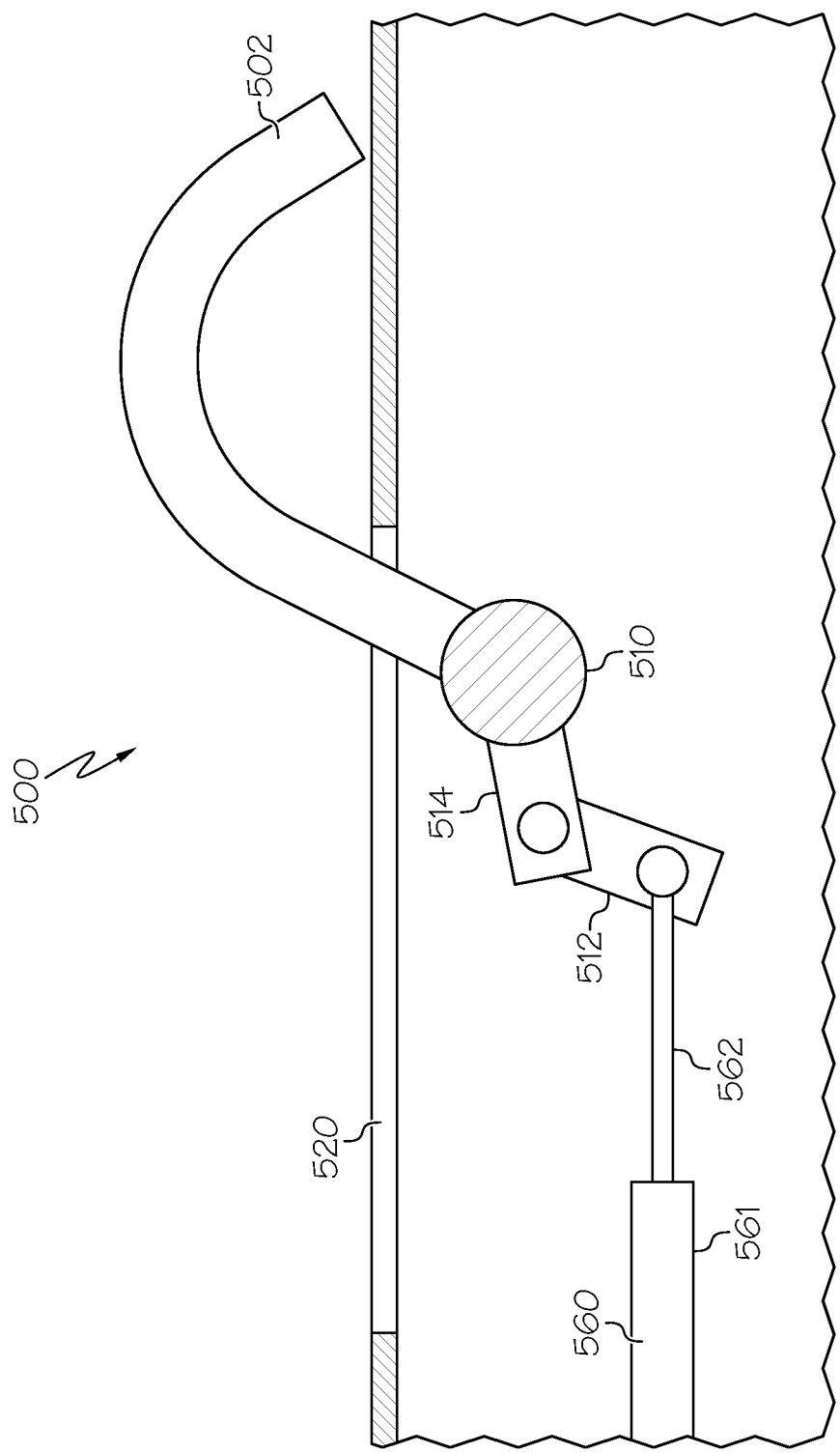
FIG. 18 is a cut away detail showing the components of the leg latch controlling mechanisms.

FIGS. 16, 17 & 18 show the details of the leg latches 500. There are four leg latches 500 to correspond to the four legs 21 of the animal 20 to be restrained in the chute 10. There is a right rear leg latch 501, a left rear leg latch 503, a right front leg latch 505, and a left front leg latch 507. Two of the leg latches 500 are mounted in the bottom rail 115, one is mounted in the front bottom bar 315 and one is mounted in the rear bottom bar 415. When the cage 100 is in the layover position the animal will be laying on its side on the inside wall 110. The two legs on that side will be laying on the inside wall 110, one near the front and one near the rear. The two leg latches 500 on the inside wall 110 are located in the openings 520 near the front and back, as best seen in FIG. 3. There is a second front leg latch 500 positioned within the front bottom bar 315 which is position to restrain the other front leg, and a second rear leg latch 500 positioned within the rear bottom bar 415 and positioned to restrain the other rear leg. The bottom rail 115 and bottom bars 315 and 415 are hollow, and have openings 520 for the hook 502 to withdraw and extend. The operative components of the leg latches 500 are mounted within the bottom rail 115 and bottom bars 315 and 415 as shown in FIG. 18. All four leg latches 501, 503. 505, and 507, are either identical or mirror images of each other, and all therefore have the same components. There is a hook 502, which is a curved, semi-circular bent metal bar. The hook 502 hooks around the leg 21 of the animal 20 restrained within the cage 100, as shown in FIG. 17. Cattle have very narrow lower legs and a large ankle bone just above the hoof 23. When the cage 100 is in the layover position the animal 20 will be laying on it side with its side laying flat on the inside wall 110 and with two legs 21 also laying directly on the inside wall 110. The animal's hooves 23 will be extending from the cage 100 with the hoof 23 and ankle bone past the bottom edge of the bottom rail 115 as shown in FIG. 16. This allows the hook 502 to loosely hook around the leg 21 of the animal as seen in FIG. 17. The curve of the hook is larger than the thin lower leg 21, but smaller than the ankle bone of the animal 20. The end of the hook 502 will touch or nearly touch the bottom rail 115 to fully enclose the leg 21. Because of the size of the ankle bone, the leg 21 will be completely restrained and secured to allow the hoof 23 to be trimmed or inspected.

The hook 502 is mounted on a rotatable axle 510 that is rotatably mounted inside the bottom rail component 115, 315 or 415. There is an opening 520 in the bottom rails 115, 315, and 415, which allow the hook 502 to be withdrawn completely so that it does not extend into the cage 100 at all when it is withdrawn, so that it cannot snag on equipment or interfere with the animal's legs as it walks into the cage 100. The hook 502 is a metal rod approximately eight inches long, and bent into a c-shaped curve. There is an elbow 514 mounted on the axle 510 approximately 60 degrees away from the point where the hook 502 is mounted. The exact degree spacing doesn't matter so long as the geometry allows the movement of the piston 560 to control the hook 502. The elbow is a flat rectangular metal bar about a half inch wide and roughly two inches long. There is a hole in the end of the elbow 514 opposite the end attached to the axle 510. The elbow 514 is rotatably attached to the wrist 512 by means of a standard nut and bolt through the hole. The wrist 512 is approximately the same size as the elbow, with two holes, one on each end.

There is a leg latch hydraulic control piston 560 also mounted within the hollow bottom rail component 115, 315 or 415. There are four identical leg latch control pistons 560 to move the leg latches 500 (501, 503, 505 and 507) from opened to the closed positions. The leg latch control pistons 560 are 1½" bore with a 4" stroke. Each leg latch control piston 560 has a cylinder 561 with an internal and movable rod 562. The bottom end of the cylinder 561 is rotatably attached inside the bottom rail component 115, 315, and 415, and the extended end of the rod 562 is rotatably attached to the wrist 512. When the control piston 560 is activated the rod 562 extends, which moves the wrist 512, which moves the elbow 514, which rotates the axle 510 and opens or closes the hook 502. Each of the leg latches 501, 503, 505 and 507 are operated independently by means of the leg latch control buttons 651-658 on the hand held controller 600.

Figure 19:
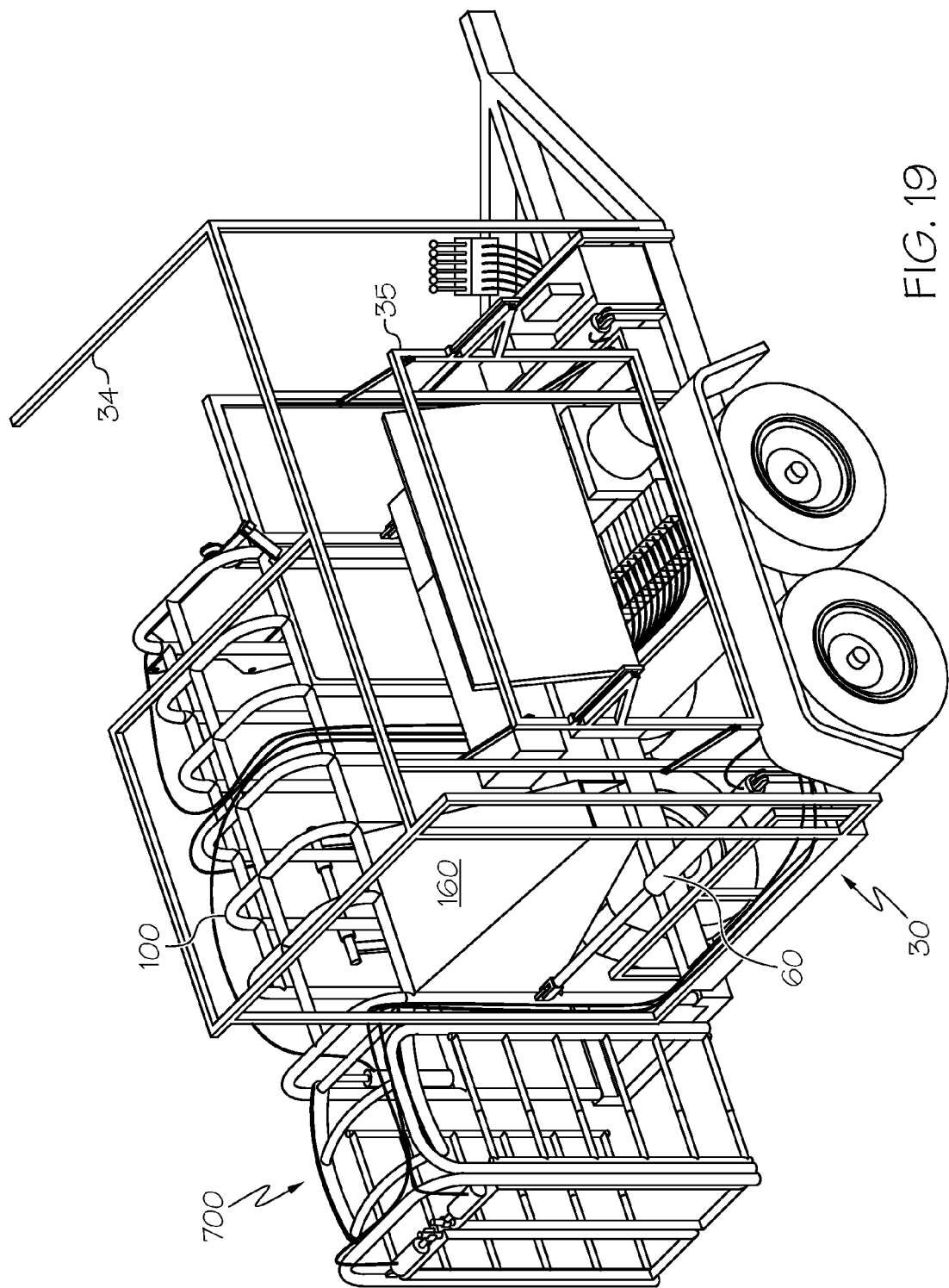
FIG. 19 is a rear perspective view of the vehicle showing the hydraulic controlling components.

FIG. 19 shows a top side rear perspective of the chute 10 showing the major features of the cage 100 and the staging area 700 but also showing the positioning of the hydraulic controlling components for this embodiment of the invention. Each of the control pistons described above have pressure and release hoses and those hoses run to the manifold on the pump. There are a series of remotely controlled servo motors mounted on the manifold that open and closed based on input from the hand held controller 600. Use and operation of hydraulic pistons in this manner is well known. The main components of each control cylinder are a piston and a rod that moves in and out of the cylinder. In the preferred embodiment all of the pistons are double acting, with two hoses connecting to the cylinder, one at the bottom and one at the top to allow quick movement of the rod. Each of the pistons are attached to the respective components at both the cylinder and rod ends, and they are rotatably mounted at both ends with a standard hinge mount to allow the components to rotate as appropriate. Each piston is controlled from a central pump with a manifold with multiple tubes connected to each piston. These types of hydraulic controllers are well known. Each of the pistons is controlled by a remotely controlled servo motor, and each servo motor is controlled by the associated button on the hand held remote controller 600. All of the servo motors and hydraulic components are housed in steel boxes, which are mounted on the vehicle 30, or in the stationary embodiment, are mounted on the stationary platform. The specific location of the boxes vary depending on the specific configuration of the chute 10.

Figure 10:
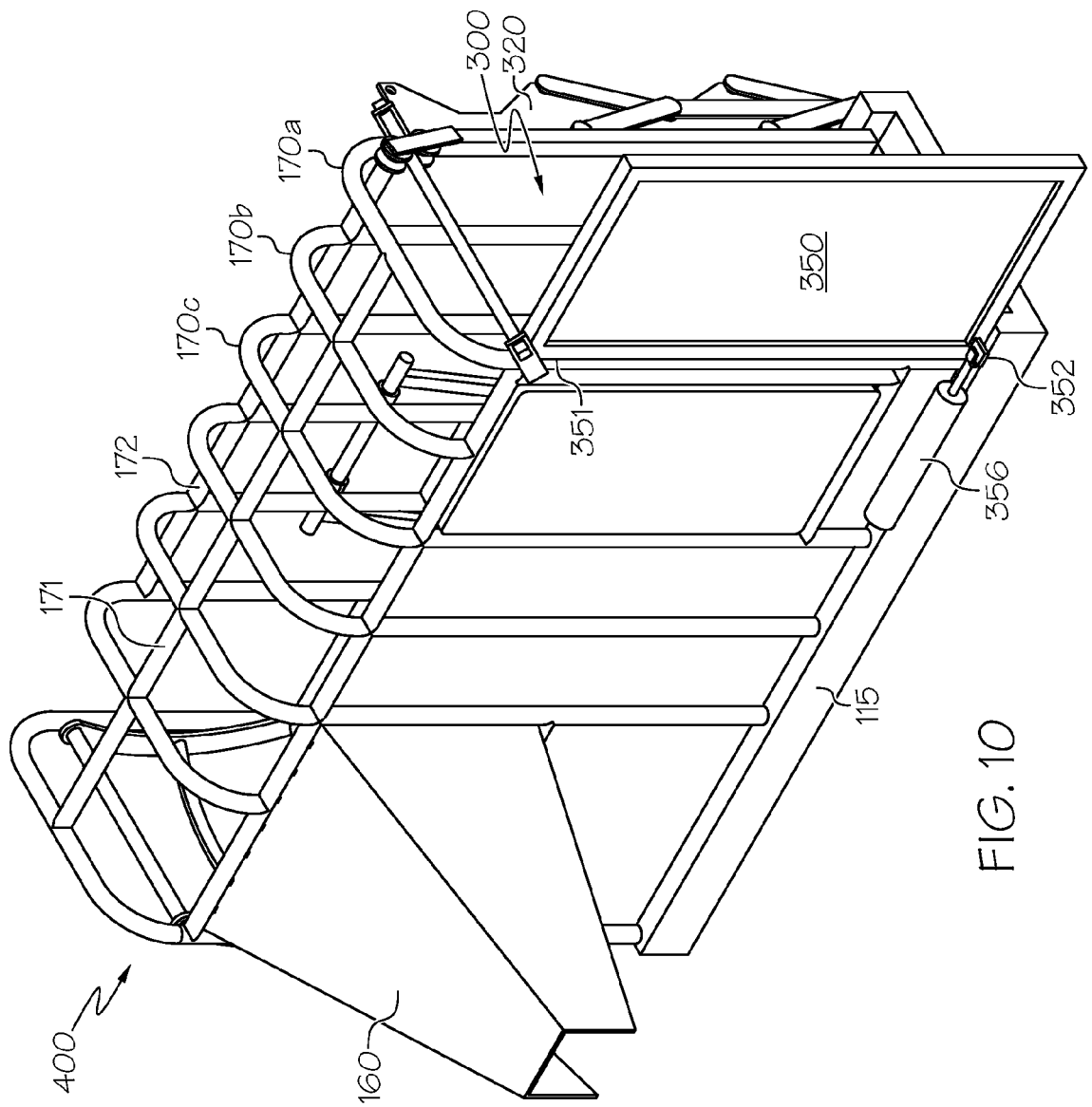
FIG. 10 is a perspective of the back of the inside wall showing the head rest and its control piston.
Figure 20:
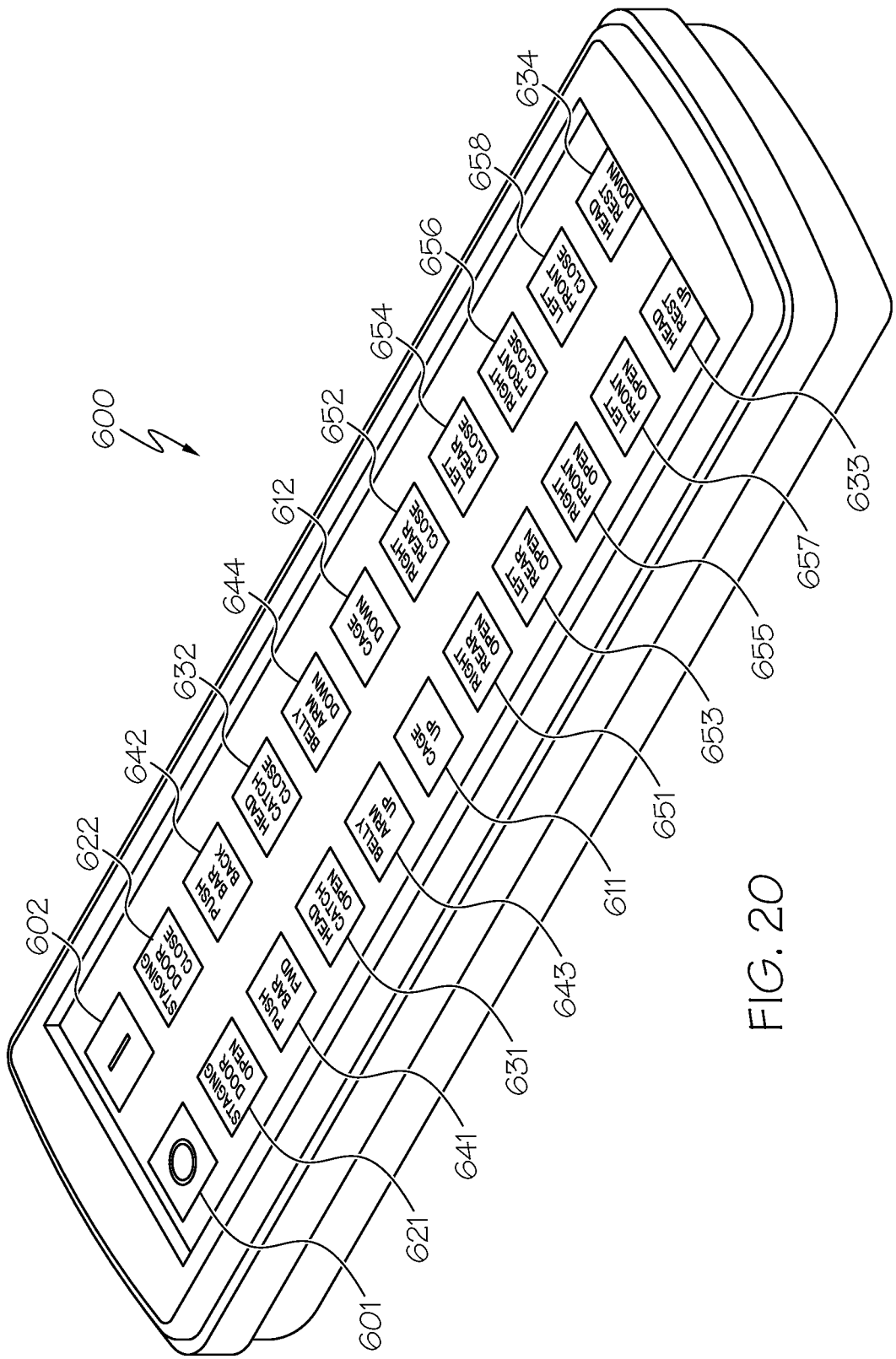
FIG. 20 is a perspective view of the hand held remote control device.

FIG. 20 shows the hand-held controller 600, which has the control buttons for each of the remotely controlled operations. The control buttons are aligned roughly in order of operation of the hoof trimming process. The control buttons are also labeled in accordance to the operation being controlled, so that a trimmer can read the buttons as he or she is operating the various components of the chute 10. The control bottoms are also paired, so one button moves a component down and the button directly to the side moves that same component up. At the top of the controller 600 are the "off" bottom 601 and the "on" button 602, which turns off and on the remote controlled components. The next paired buttons are the buttons to control the staging doors 703 and 705, the "staging door open" button 621 and the "staging door closed" button 622. These open and close the both of the staging doors 703 and 705 at the same time to allow an animal 20 to enter the cage 100. Next are the "push bar forward" button 641 and "push bar back" button 642, which control the tail gate 400 by activating the tail gate control piston 460 to swing the tail gate 400 down, which pushes the animal 20 into the cage 100. The "push bar back" button 642 opens the tail gate 400. The "head catch open" button 631 and "head catch close" button 632 control the head gate 300, with the "head catch close" button 632 closing the head gate 300, and the "head catch open" button 631 opening the head gate 300. The "belly arm up" button 643 activates the belly bar piston 260 and swings the belly bar 220 upward and into the belly of the animal 20. The "belly arm down" button 644 swings the belly bar 220 down and away from the animal to release it. The "cage up" button 611 activates the two paired layover pistons 60a and 60b, which rotates the cage 100 upward into the layover position. The "cage down" button 612 rotates the cage 100 back into the horizontal or upright position so that the animal 20 is standing position. The next four buttons control the four leg latches 500, opening and closing each. The "right rear open" button 651 opens and the "right rear close" button 652 closes the right rear leg latch 501. The "left rear open" button 653 opens and the "left rear close" button 654 closes the left rear leg latch 503. The "right front open" button 655 opens and the "right front close" button 656 closes the right front leg latch 505. The "left front open" button 657 opens and the "left front close" button 658 closes the left front leg latch 501. Finally, the "head rest up" button 633 moves the head rest 350 into the "up" or closed position adjacent to the head gate 300, and the "head rest down" button 634 moves the head rest into the down position, which places it in a plane with the inside wall 110 as shown in FIG. 10 to provide a head rest for the animal 20 when restrained in the cage 100 while in the layover position.

In the preferred embodiment the hand-held controller 600 includes a standard lanyard that allows the user to attach the controller 600 to a belt or other clothing for ease of use and retrieval. In an alternate embodiment a smart phone or tablet computer can download a software application, or app, that includes all of the control features of the hand held controller 600.

When the chute 10 is mounted on a vehicle 30, such as a truck or trailer, there needs to be additional stabilization when the chute 10 is in use. The chute 10 is heavy and when an animal 20 is in the chute 10 it adds to the weight, and without additional stabilization all of this weight would be borne by the vehicle's 30 suspension. This could potentially damage the vehicle's suspension, and would also be unstable because the vehicle 30 would likely move as the cage 100 is lifted and rotated. To stabilize the vehicle there are front and rear downriggers. The two downriggers are essentially the same, except for the location on the vehicle 30. The downriggers consist of a brace frame and two pistons mounted on the vehicle, and a footer that is extended onto the ground. When the pistons are extended the footers of the downriggers are pushed onto the ground and the vehicle 30 is lifted off the ground. This places all of the weight of the vehicle 30 onto the downriggers 40 and off the vehicle suspension, and prevents movement of the vehicle during the operation of the chute 10.

As seen in FIG. 19, there is an accessory frame 34 on the vehicle. The accessory frame 34 is constructed of 1"×1" aluminum posts welded together to form a box around the vehicle 30. In one configuration there is a roll up awning located on the top of the frame that can be pulled across the frame and provide shade over the chute 10 and more importantly the operator. There is also an adjustable gate rack 35 located on the frame 34 on the opposite side of the vehicle 30 from the cage 100. Hoof trimmers often carry their own fencing to the job site to construct the temporary narrow walkways used to channel the animals and bring them to the rear of the chute 10. This temporary fencing is often strapped to the chute 10 by means of rope or bungee-cord. The adjustable gate rack 35 provides a secure place to mount the temporary fencing. It is adjustable by means of a hydraulic piston that moves the gate rack 35 from a lowered to a raised position. In the lowered position the gate rack 35 is approximately ten feet off the ground which allows the operator to easily place the fencing onto the rack 35 and easily remove it from the rack 35. When the gate rack 35 is raised into the raised position the fencing is moved up and away from the rear wheels of the vehicle 30.

Because of the configuration of the chute mounted on the vehicle, there are numerous spaces for mounting of storage and tool boxes. The boxes are standard steel plated boxes. The hydraulic pump for the hydraulic pistons are contained within these boxes, as well as the remote controls for the pistons. A number of boxes are left empty and can be used by the operator to store tools, supplies and other equipment for hoof trimming. One of the supplies commonly used by hoof trimmers is hoof glue, which is used for chipped or damaged hoofs. It is also not uncommon to glue a temporary pad onto the bottom of a hoof 23 to protect a damaged or injured hoof. There are a variety of different glues and most are biodegradable. One common glue is applied hot and solidifies as it cools. Many hoof trimmers will wrap a container of the glue in a standard heating pad to warm the glue while trimming. The chute 10 disclosed herein includes a hot box 70 with an integrated heating element to heat the contents of the box. The hot box 70 is a standard six sided box, with one side that contains a door. These storage and tool boxes are for the convenience of the end user, and the specific location and configuration can vary depending on the vehicle.

In operation the vehicle 30 is positioned and the two downriggers 40 deployed to stabilize the chute 10. The gate rack 35 is lowered and the temporary fencing is removed and placed to created a narrow walkway to move animals 20 in single file toward the rear of the chute 10. The last section of fencing will be attached to the staging area 700 so that the narrow walkway terminates at the staging area doors 703 and 705. (This will not be necessary in the stationary embodiment.) Animals 20 are herded in single file through the walkway to just before the staging area doors 703 and 705. The cage 100 will be rotated downward into the upright or standing position, as shown in FIG. 1 and FIG. 2. The cow pusher rear gate 400 and in one embodiment the rear bottom channel 415 will be in the open position. The head gate 300 will be partially opened. It is open enough so that a cow's head 24 will easily fit through, but spaced so that the cow's shoulders will not fit through the opening. The staging area doors 703 and 705 are open by pressing the staging door open button 601 on the hand-held remote control 600 and the first animal 20 is herded into the cage 100. As soon as the animal 20 is through the staging area doors 703 and 705 they are closed by pressing the staging door closed button 602 to prevent another animal 20 from moving into the cage 100 or getting in the way of the tail gate 400.

In most cases the animal 20 will move forward into the cage 100 on its own, but in other cases the operator or an assistant will encourage the animal 20 to move forward. In most cases the animal will see the opening in the front gate 300 and will try to go through it, which means that it's head 24 will go to and through the narrow opening. In that situation, once the head 24 is through the partially open head gate 300 the operator will close the head gate 30 by pressing the head catch close button 631 on the hand held controller 600. In some situations the animal 20 will move most of the way into the cage 100 but not extend its head 24 fully through the head gate 300. In that situation the animal 20 can be urged forward by closing the cow pusher tail gate 400, and in one embodiment when the cow pusher 400 is closed the rear bottom channel 440 will also close. This is accomplished by pressing the push bar forward button 641 on the controller 600. Typically, when the animal 20 feels force being applied from the rear, which in this case is applied by the cow pusher tail gate 400 and the rear bottom channel 415, the animal 20 will continue to move forward and push its head and neck through the partially opened head gate 300, and the operator will close the head gate 300. Once the body of the animal 20 is fully within the cage 100 the tail gate 400 and rear bottom channel 440 are closed.

Next the belly restraint 200 is activated by pressing the belly arm up button 643 on the controller 600, which activates the piston 260 and the belly bar 220 is pushed against the animal's belly. This forces the animal 20 against the inside wall 110 and holds it in place. Once the animal 20 is fully immobilized in the cage 100, the cage 100 is rotated by pressing the cage up button 611, which activates the cage control piston 60 and rotates the cage 100. If the cage 100 is fully rotated 90 degrees it will be in the layover position. But typically the cage 100 is stopped at about 60 or 70 degrees and the animal's legs 21 are restrained with the leg latches 500. Leg restraint is done in this position because the animal 20 is typically more docile when slightly inclined, and because its legs 21 will naturally be extended when not in the fully supine position. The operator can grab the leg 21 with one hand and press the appropriate button on the hand held remote control 600 to secure the leg latch 500 around the leg 21. This is accomplished by pressing the appropriate closing button 652, 654, 656 and 658 on the controller 600. Once all four legs 24 are restrained, the cage 100 will be rotated to the full layover position. With the cage 100 in the layover position, and the legs 21 secured with the leg latches 500, the hooves 23 will be secured and extending outwardly from the bottom of the cage 100 where it will be easy to inspect the legs 21 and hooves 23 for injury or disease, and to trim the hooves 23. Trimming is done with a standard grinder. In some cases a hoof 23 may be injured or there is a visible sore, and the trimmer will have access to treatment supplies in one of the storage boxes located on the vehicle 30, some of which are located below the cage 100 in the layover position.

Once the hooves 23 have been trimmed and the animal's legs 21 inspected the operator can record the animal's information on a computer or tablet, which can be conveniently stored in the computer slot located on the staging area 700. The operator will then release the four leg latches 500 by means of the leg latch opening buttons 651, 653, 655, and 657. The cage 100 can then be rotated from the layover position back to the upright position by pressing the cage down button 612. The animal 20 will naturally place its hooves 23 onto the ground. The operator will then release the belly restraint 200 by pressing the belly arm down button 644, and then open the front gate 300 by pressing the head catch open button 631. The animal 20 will leave the cage 100. Most animals 20 will leave on their own, but in some cases the operator can encourage the animal to leave either by slapping or pushing on the hindquarters.

The hand-held controller 600 allows the operator to move fully about the chute 10 during the entire trimming process. He can easily position himself to watch the animal 20 as it enters the staging area 700 and then the cage 100, which allows him to know precisely when the open and close the staging area doors 703 and 705, the rear gate 400, the head gate 300, the belly restrain 200, the main cage 100 controller, and each of the individual leg latches 500. The lanyard allows the operator to release the controller 600 so that his hands will be available for the trimming process.

The present invention is well adapted to carry out the objectives and attain both the ends and the advantages mentioned, as well as other benefits inherent therein. While the present invention has been depicted, described, and is defined by reference to particular embodiments of the invention, such reference does not imply a limitation to the invention, and no such limitation is to be inferred. The depicted and described embodiments of the invention are exemplary only, and are not exhaustive of the scope of the invention. Consequently, the present invention is intended to be limited only be the spirit and scope of the claims, giving full cognizance to equivalents in all respects.

I claim:

1. An animal restraining device comprising:
    a four sided restraining cage consisting of an inside wall, an outside wall, a closable front opening, and a closable rear opening; wherein an animal enters the restraining cage through the rear opening and exits the cage through the front opening;
    a tail gate for closing the closable rear opening;
    a rotatable enclosed staging area for controlling the entry of multiple animals into the restraining cage;
    a head gate for closing the closable front opening, wherein head gate moves from an open position to allow the animal to leave the restraining cage to a closed position that secures the head of the animal to restrain the animal within the restraining cage;
    a belly restraint for temporarily securing the body of the animal within the restraining cage;
    a rotating mechanism for rotating the restraining cage from a standing position, when the animal enters the restraining cage, to a layover position, that lays the animal on the animal's side;
    a shoulder pad positioned within the inside wall to provide padding for the shoulder of the animal when the restraining cage is in the layover position;
    a hinged head rest for supporting the head of the animal when the restraining cage is in the layover position: and
    four hooked leg latches for securing the lower legs of the animal so that the legs are stationary.

2. The animal restraining device of claim 1, wherein the inside wall and outside wall are constructed from a series of parallel ribs made from a series of U-shaped bars, wherein each U-shaped bar is a single component and wherein the ribs of the inside wall are one side of the U-shaped bar and the ribs of the outside wall are the other side of the U-shaped bar whereby the parallel ribs of the inside wall and outside wall are made from the same bars to provide structural support for the restraining cage.

3. The animal restraining device of claim 1, wherein the tail gate is pivotably attached to a top of the closeable rear opening such that the tail gate swings down from the top, and wherein the tail gate is curved to cup the hindquarters of the animal to push the animal into the restraining cage and to prevent the animal from backing out of the restraining cage.

4. The four sided animal restraining device of claim 3, wherein further the tail gate is moved between an opened and a closed position by means of a hydraulic piston remotely controlled by a hand held device.

5. The animal restraining device of claim 1, wherein the head gate is movable between an open position to a closed position, wherein when in the closed position there is a gap slightly wider than the neck of the animal but narrower than the head or shoulders of the animal so that the animal's head is restrained, thereby restraining the animal within the restraining cage.

6. The animal restraining device of claim 5, wherein the head gate is moved between the open and the closed position by means of a hydraulic piston remotely controlled by a hand held device.

7. The animal restraining device of claim 5, wherein the head gate consists of a hydraulically moved sliding bar that is mounted in a bottom sliding channel and secured by top rollers to a rail and slides between the open and the closed position.

8. The animal restraining device of claim 5, wherein the head gate consists of a swinging gate that is mounted by hinges on one a side of the front opening and swings from the open to the closed position.

9. The animal restraining device of claim 1, wherein the enclosed staging area is movably attached adjacent to the rear opening of the restraining cage.

10. The animal restraining device of claim 9, wherein the enclosed staging area consists of two parallel fencing sides that are planar with the inside wall and the outside wall when the staging area is in position at the rear of the restraining cage, and two staging area doors that swing outward and away from the restraining cage.

11. The animal restraining device of claim 10, wherein the staging area doors are opened and closed by means of hydraulic pistons remotely controlled by a hand held device.

12. The animal restraining device of claim 9, wherein the enclosed staging area is rotatably attached at the rear of the restraining cage.

13. The animal restraining device of claim 1, wherein the belly restraint consists of a rotatable belly bar pivotably mounted on the outside wall such that the belly bar rotates into the restraining cage and presses against the belly of the animal to pin the animal against the inside wall.

14. The animal restraining device of claim 13, wherein the rotatable belly bar is moved by means of a hydraulic piston remotely controlled by a hand held device.

15. The animal restraining device of claim 1, wherein the head rest is attached to the closable front opening by means of hinges, and wherein when the restraining cage is in the layover position the head rest is planar with the inside wall to support the head of an animal in the restraining device.

16. The animal restraining device of claim 15, wherein the head rest is movable by means of a hydraulic piston remotely controlled by a hand held device.

17. The animal restraining device of claim 1, wherein the restraining cage is pivotably mounted on a platform and rotated by the rotating mechanism which consists of a hydraulic pistons remotely controlled by a hand held device.

18. The animal restraining device of claim 17, wherein the platform is attached to a vehicle.

19. The animal restraining device of claim 18, wherein the vehicle is a truck.

20. The animal restraining device of claim 19, wherein the vehicle is towable hitched trailer.

21. The animal restraining device of claim 1, wherein the hooked leg latches are mounted along a bottom edge of the restraining cage.

22. The animal restraining device of claim 21, wherein the leg latches are rotated by a multiplicity of hydraulic pistons that are remotely controlled by a hand held device.

23. The animal restraining device of claim 21, wherein one of the hook end leg latches is mounted on a bottom edge of the closable front opening, one of the hook end leg latches is mounted on a bottom edge of the closable rear opening, one of the hook end leg latches is mounted on a front of a bottom edge of the inside wall, and one of the hook end leg latches is mounted on a rear of the bottom edge of the inside wall.

24. The animal restraining device of claim 21, wherein the hook-end leg latches are mounted within a hollow bottom rail to protect the animal from the controlling mechanisms.

25. A cattle hoof trimming chute comprising:
 a four sided cage sized to hold an animal and rotatably attached to a platform and rotatable from an upright standing position to a horizontal layover position, said cage having an inside wall, an outside wall, a closable front opening, and a closeable rear opening;
 said inside wall and said outside wall constructed from a multiplicity of U-shaped bars wherein one side of the multiplicity of U-shaped bars forms ribs for the inside wall and the other side of the U-shaped bars forms parallel ribs for the outside wall;
 said inside wall having a shoulder pad positioned to correspond to the shoulder of the animal to protect the animal when the cage is in the layover position;
 said inside wall further having a grated opening and a feces funnel positioned to correspond to the anus of the animal when the cage is in the layover position; and
 said outside wall having a belly restraint rotatably attached thereto, wherein said belly restrain rotates into the cage to press against the belly of the animal and force the animal against the inside wall thereby pinning said animal within the cage, said belly restraint moved by a hydraulic piston and controlled by a hand held remote control device.

26. The cattle hoof trimming chute of claim 25, further comprising:
 a head gate movable between an opened and a closed position to partially close said front opening, wherein when said head gate is in the closed position there is an opening wide enough for the animal's neck but not wide enough for the animal's head or shoulders to prevent the animal from withdrawing the animal's head or moving the animal's body through, said head gate moved by a hydraulic piston and controlled by a hand held remote control device.

27. The cattle hoof trimming chute of claim 25, further comprising:
 a head rest pivotably attached to said inside wall such that said head rest is planar with said inside wall when said cage is in the layover position;
 wherein said head rest is positioned by a hydraulic piston that is controlled by a hand held remote control device; and whereby said head rest provides support for the animal's head when the cage is in the layover position.

28. The cattle hoof trimming chute of claim 25, further comprising:
 a tail gate to partially close said rear opening, wherein said tail gate is pivotably mounted to a top portion of said rear opening such that the tail gate swings down to partially close said rear opening, and wherein further said tail gates is curved to conform to the haunch of the animal to aid in moving the animal into the cage and restraining the animal in the cage; wherein said tail gate is moved by means of a hydraulic piston controlled by a hand held remote control device.

29. The cattle hoof trimming chute of claim 25, wherein said platform is attached to a vehicle.

30. The cattle hoof trimming chute of claim 25, further comprising:
 four leg latches with hook ends mounted within a hollow bottom rail positioned along a bottom edge of said cage wherein said hook ends encircle the lower legs of the animal to secure the legs when the cage is in the layover position; wherein two leg latches are mounted along a bottom edge of the inside wall, one leg latch is mounted along a bottom edge of said front opening, and one leg latch is mounted along a bottom edge of said rear opening; wherein further said leg latches are individually moved by a hydraulic piston and wherein each of said hydraulic pistons in controlled by a hand held remote control device.

31. The cattle hoof trimming chute of claim 25, further comprising:
 a rear enclosed staging area attached to said platform and position adjacent to said closeable rear opening to allow animals to be temporarily positioned behind said cage and kept out of the way of said rear tail gate; wherein said rear enclosed staging area consists of an inside parallel side fence which is planar with the inside wall of the cage when the staging area is in position, and an outside parallel side fence which is planar with the outside wall of the cage when the staging area is in position, and hydraulically controlled staging area door moved by a hydraulic piston which is controlled by a hand held remote control device.

* * * * *